United States Patent
Yamada et al.

(10) Patent No.: US 9,854,107 B2
(45) Date of Patent: Dec. 26, 2017

(54) ALLOCATION APPARATUS FOR ALLOCATING INFORMATION PROCESSING DEVICE TO BE MANAGED, ALLOCATION METHOD, PROGRAM FOR ALLOCATION, AND MANAGEMENT SYSTEM

(71) Applicant: Konica Minolta Inc., Chiyoda-ku, Tokyo (JP)

(72) Inventors: Kei Yamada, Hino (JP); Hirotomo Ishii, Osaka (JP); Seigo Kawamura, Ibaraki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/852,057

(22) Filed: Sep. 11, 2015

(65) Prior Publication Data
US 2016/0100066 A1 Apr. 7, 2016

(30) Foreign Application Priority Data
Oct. 1, 2014 (JP) .................................. 2014-202846

(51) Int. Cl.
*G06F 15/00* (2006.01)
*H04N 1/00* (2006.01)
(Continued)

(52) U.S. Cl.
CPC ....... *H04N 1/00204* (2013.01); *H04L 41/042* (2013.01); *H04L 43/0817* (2013.01);
(Continued)

(58) Field of Classification Search
CPC ................................................ H04N 1/00344
(Continued)

(56) References Cited

U.S. PATENT DOCUMENTS

2003/0212783 A1* 11/2003 Sakai .................. H04L 41/0806
709/223
2014/0240441 A1* 8/2014 Hinohara ........... H04N 1/00228
348/14.04
2014/0293325 A1* 10/2014 Haapanen ............. G06F 3/1268
358/1.15

FOREIGN PATENT DOCUMENTS

JP    2005-026960 A    1/2005
JP    2006-260216 A    9/2006
(Continued)

OTHER PUBLICATIONS

Office Action (Notice of Reasons for Rejection), issued by the Japanese Patent Office in corresponding Japanese Patent Application No. 2014-202846 dated Nov. 28, 2016 (6 pages including partial English translation).

*Primary Examiner* — Saeid Ebrahimi Dehkordy
(74) *Attorney, Agent, or Firm* — Buchanan Ingersoll & Rooney PC

(57) ABSTRACT

An allocation apparatus configured to allocate a plurality of information processing devices to two or more management apparatuses that perform distributed management of the plurality of information processing devices, the allocation apparatus includes: an allocation unit configured to allocate an address range on a network, allocatable to a plurality of information processing devices, to the two or more management apparatuses; and an acquisition unit configured to obtain, from each of the two or more management apparatuses, management information indicating a state of the information processing device whose address belongs to a range allocated to the management apparatus, wherein the allocation unit dynamically performs allocation of the address range on the network based on the management information that has been obtained by the acquisition unit.

14 Claims, 21 Drawing Sheets

(51) Int. Cl.
*H04L 29/12* (2006.01)
*H04L 12/24* (2006.01)
*H04L 12/26* (2006.01)

(52) U.S. Cl.
CPC ...... *H04L 61/2007* (2013.01); *H04L 61/2061* (2013.01); *H04N 1/00095* (2013.01); *H04N 1/00344* (2013.01); *H04L 41/044* (2013.01); *H04L 43/103* (2013.01); *H04N 2201/0094* (2013.01)

(58) Field of Classification Search
USPC ........................................................ 358/1.15
See application file for complete search history.

(56) References Cited

FOREIGN PATENT DOCUMENTS

| | | |
|---|---|---|
| JP | 2011-039725 A | 2/2011 |
| JP | 2012-133571 A | 7/2012 |

* cited by examiner

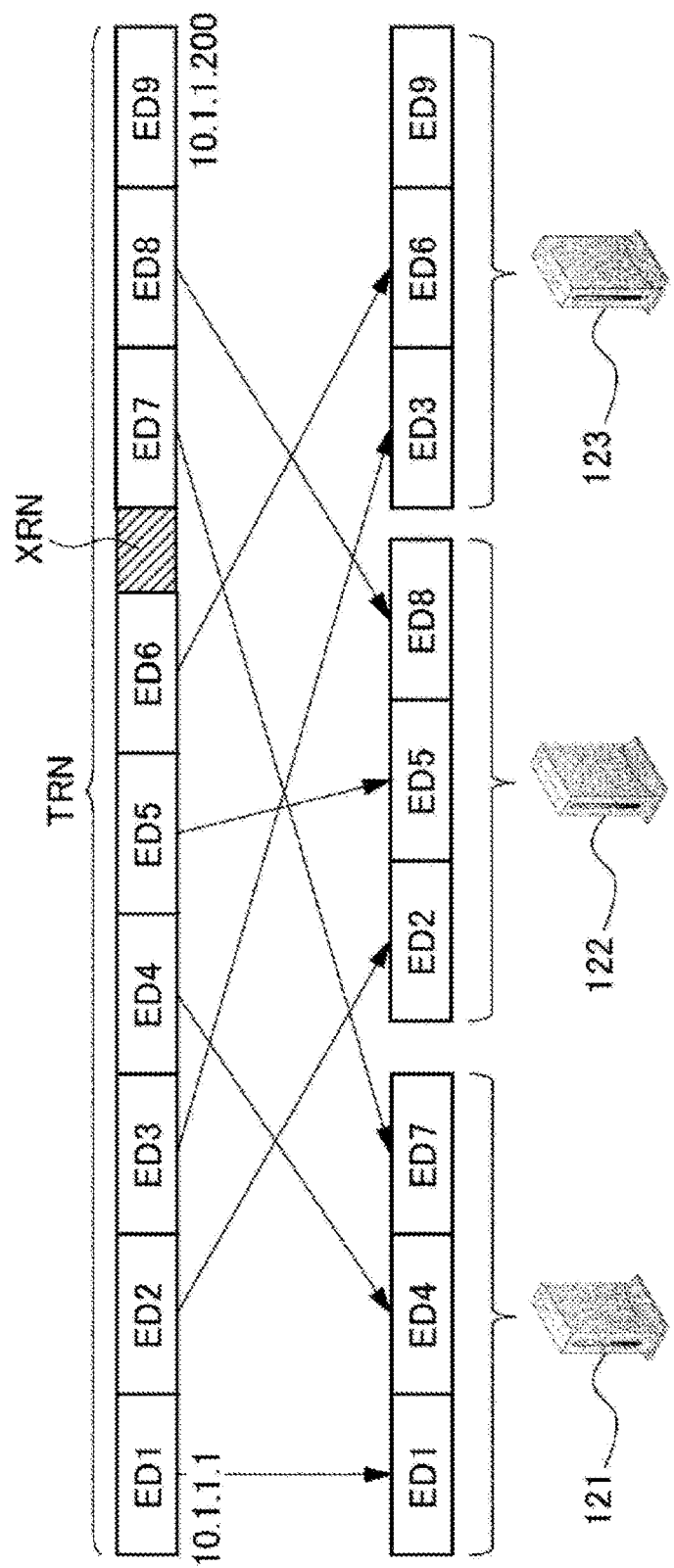

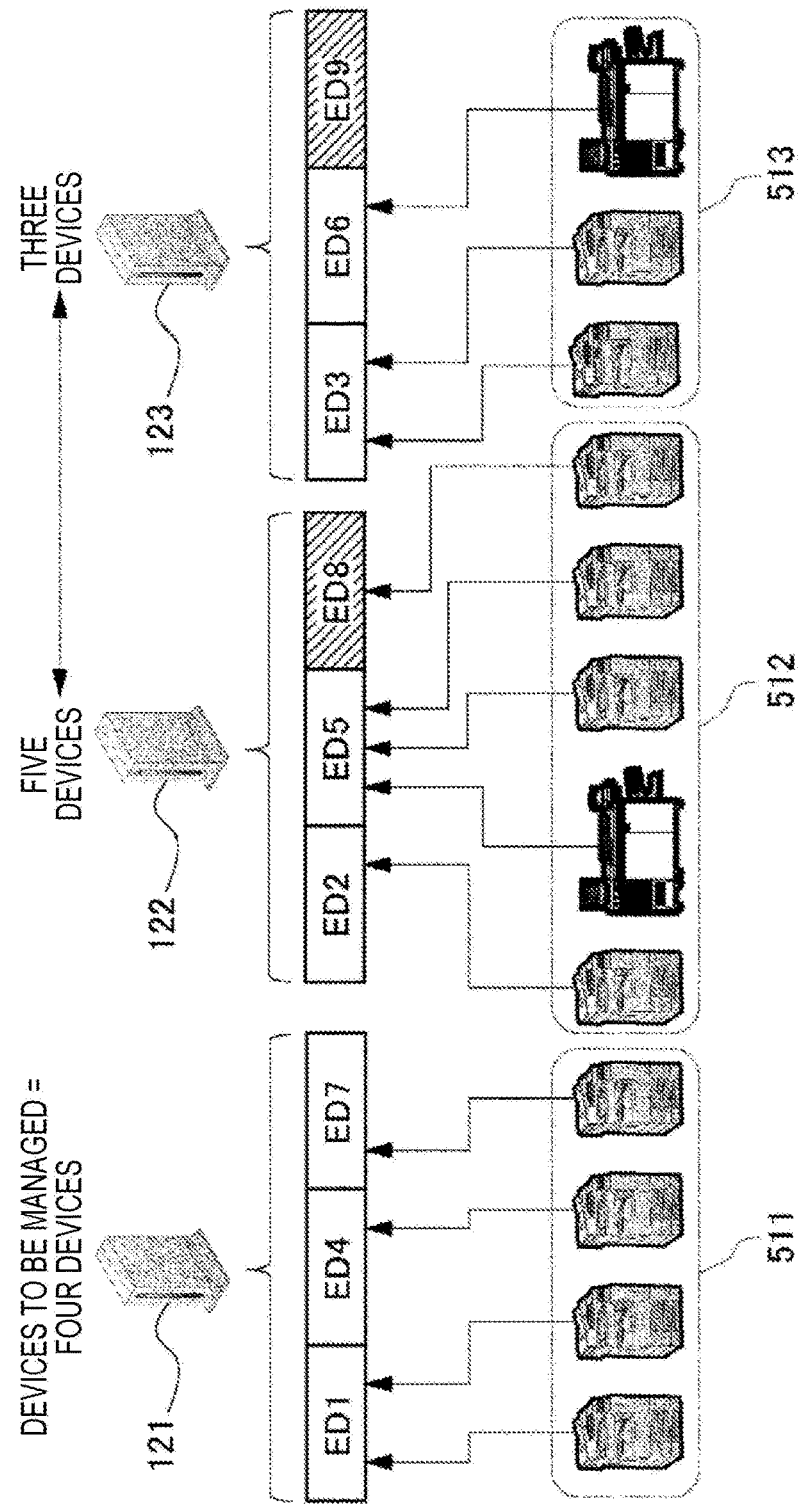

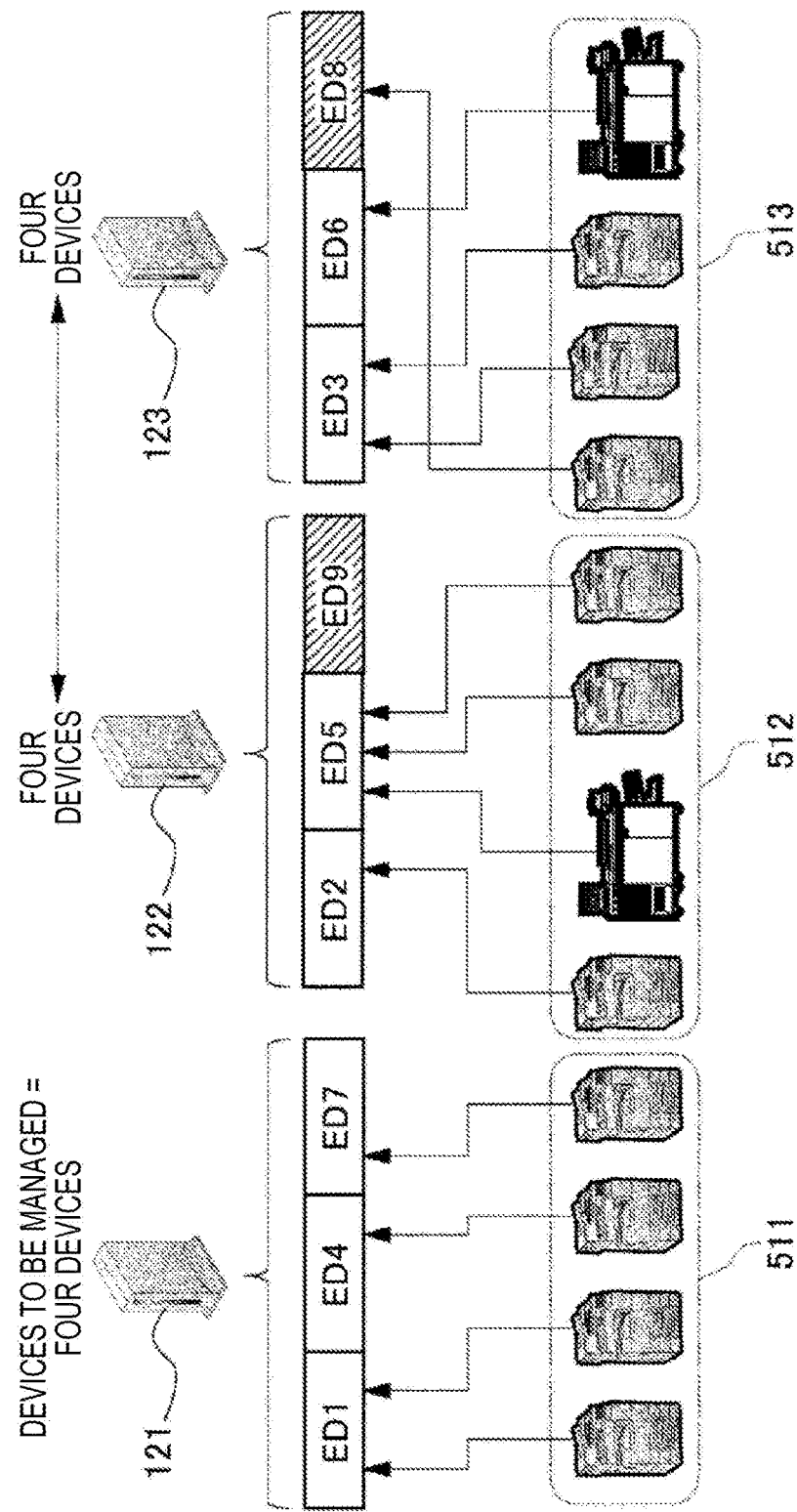

FIG. 8B

| MANAGEMENT APPARATUS | ADDRESS RANGE | DEVICE (IP ADDRESS) | IMPORTANCE LEVEL | TOTAL | VARIATION |
|---|---|---|---|---|---|
| FIRST | 10.1.1.1 – 10.1.1.50 | DEV-PP-01 (10.1.1.4) | 80 | 110 | ±0 |
| | | DEV-A3-01 (10.1.1.8) | 20 | | |
| | | DEV-A4-01 (10.1.1.32) | 10 | | |
| SECOND | 10.1.1.51 – 10.1.1.84 | DEV-PP-02 (10.1.1.55) | 100 | 110 | ±0 |
| | | DEV-A4-02 (10.1.1.70) | 10 | | |
| THIRD | 10.1.1.85 – 10.1.1.150 | DEV-A3-02 (10.1.1.85) | 40 | 100 | −10 |
| | | DEV-A3-03 (10.1.1.103) | 30 | | |
| | | DEV-A3-04 (10.1.1.109) | 20 | | |
| | | DEV-A4-03 (10.1.1.135) | 10 | | |

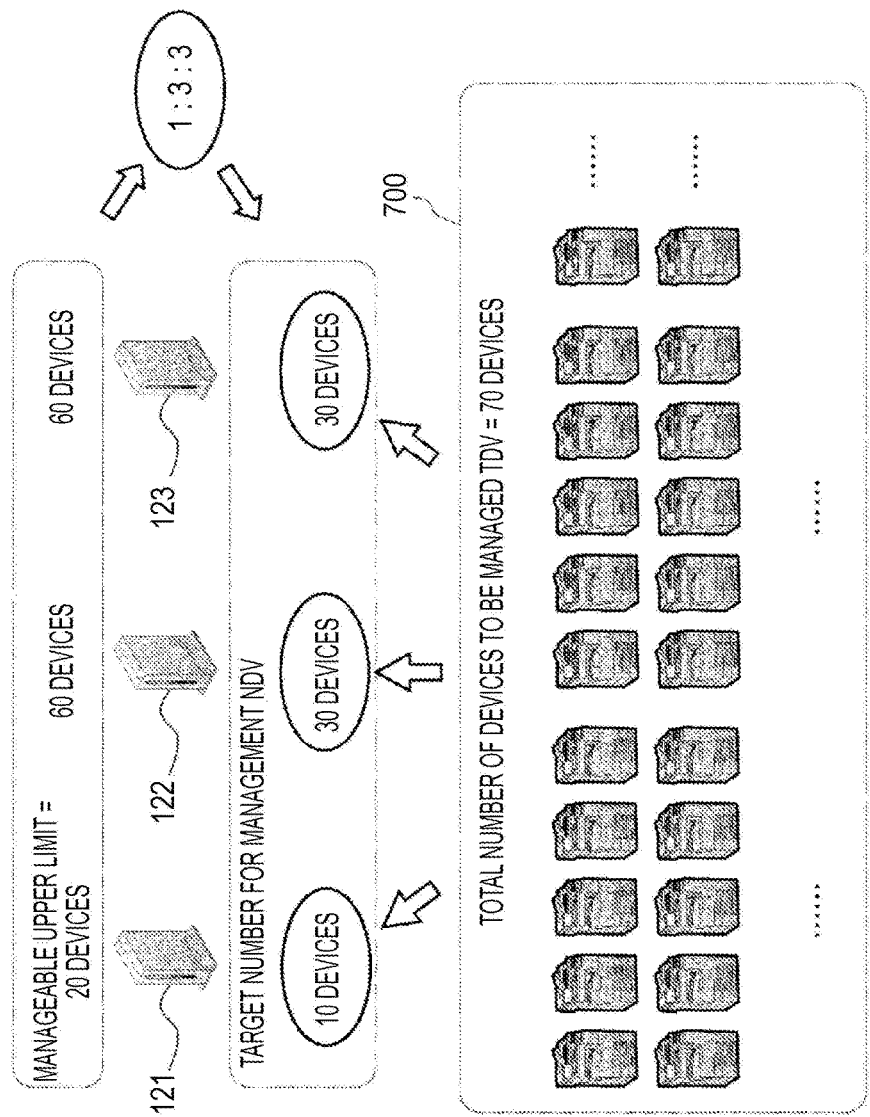

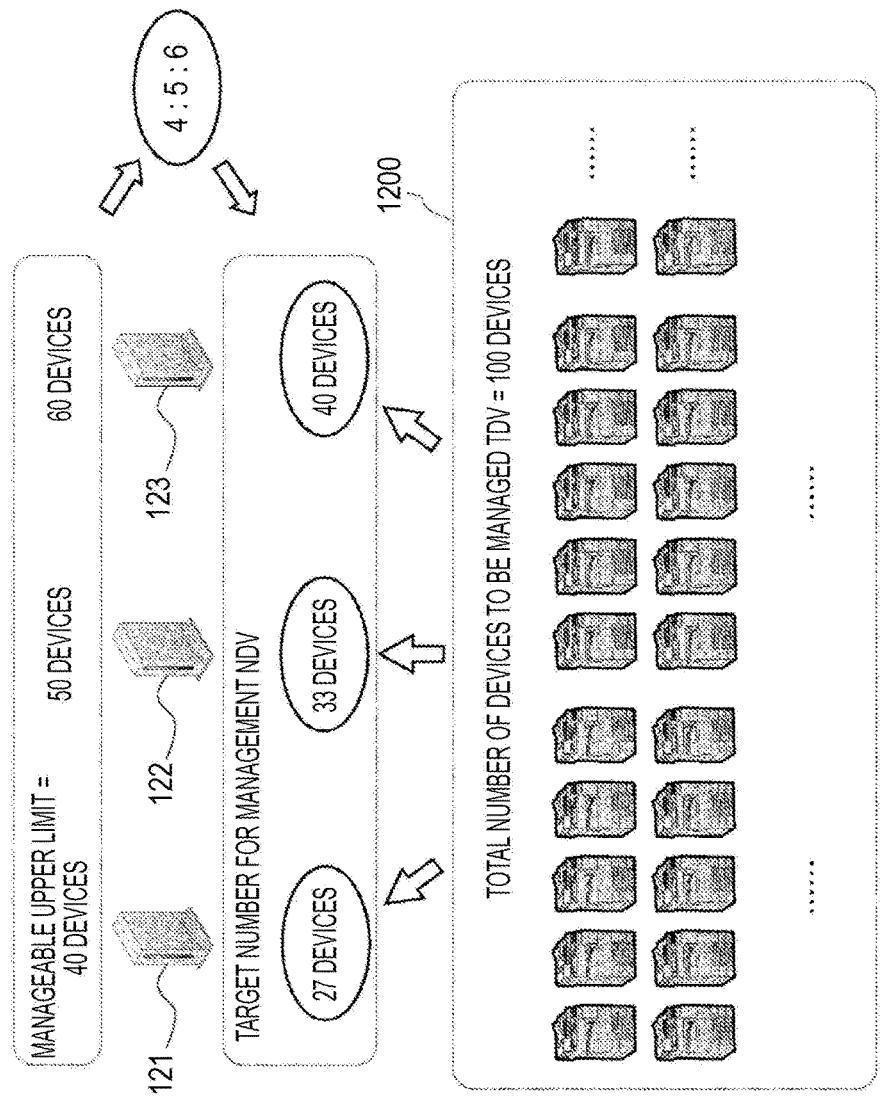

FIG. 12B

| DIVISION UNIT UDV | NUMBER OF DEVICES MDV (DEVIATION DEV FROM TARGET NUMBER FOR MANAGEMENT NDV) | | | TOTAL |
|---|---|---|---|---|
| | FIRST MANAGEMENT APPARATUS NDV = 27 | SECOND MANAGEMENT APPARATUS NDV = 33 | THIRD MANAGEMENT APPARATUS NDV = 40 | |
| 27 | 27 × 1 = 27 (0%) | 27 × 1 = 27 (18%) | 27 × 1 = 27 (33%) | 81 |
| 13 | 13 × 2 = 26 (4%) | 13 × 2 = 26 (21%) | 13 × 3 = 39 (3%) | 91 |
| 6 | 6 × 4 = 24 (11%) | 6 × 5 = 30 (9%) | 6 × 6 = 36 (10%) | 90 |

ALLOCATION APPARATUS FOR ALLOCATING INFORMATION PROCESSING DEVICE TO BE MANAGED, ALLOCATION METHOD, PROGRAM FOR ALLOCATION, AND MANAGEMENT SYSTEM

The entire disclosure of Japanese Patent Application No. 2014-202846 filed on Oct. 1, 2014 including description, claims, drawings, and abstract are incorporated herein by reference in its entirety.

BACKGROUND OF THE INVENTION

Field of the Invention

The present invention relates to a management system for an information processing device, particularly relates to a distributed management technique thereof.

Description of the Related Art

A "management system for an information processing device" is a system that causes a host computer to monitor a plurality of information processing devices via a network, so as to maintain the information processing devices. Examples of the information processing devices to be managed (hereinafter, also referred to as a "device") include a printer, a copier, a multifunction peripheral (MFP), a personal computer (PC), or a server-dedicated device. A host computer (hereinafter, referred to as a "center host" as a management administrating body may be, for example, a PC, a server-dedicated device, or a main frame computer. When any of the devices encounters a malfunction such as: out-of-paper, out-of-toner, out-of-ink, or paper jam; or an illegal access such as a computer virus and phishing, the center host detects the abnormality and reports it to an administrator.

As a network technology as represented by the Internet has been widely used, the number of devices to be managed by one management system is continuously increasing. Along with this, a burden on the center host is becoming excessive.

As a method to decrease the burden on the center host, a technique of introducing a distributed management to the management system is known (refer to JP 2012-133571 A1, for example). With this technique processing for device management is distributed to a plurality of management apparatuses. The management apparatus monitors allocated devices alone. If abnormality is found in any of the devices, the management apparatus notifies the center host of the abnormality. With this, the center host need not directly monitor the device, decreasing the burden thereof.

On the other hand, however, a difference of burden is likely to occur among the management apparatuses. The more the number of devices, the difference is likely to increase, in particular. When this difference is excessive, the required amount of resources varies greatly among the management apparatuses. This is not preferred in view of costs.

As a method for equalizing the burden among the management apparatuses, there is a known technique for dynamically changing allocation of the devices for the management apparatuses according to varying burden on the management apparatus (refer to JP 2006-260216 A1, for example).

Distributed management of devices in a management system assumes that dynamic allocation of the devices for the management apparatus is to be implemented by an information processing apparatus (hereinafter, referred to as an "allocation apparatus"). The types of processing to be performed by the allocation apparatus mainly include the following four: (A) Identifying devices on a network to detect a new device; (B) Monitoring the management apparatuses and based on the state of each of the apparatuses, evaluating the burden on each of the apparatuses; (C) When a new device has been detected, or variation in the burden among the management apparatuses becomes excessive, changing the allocation of the devices to each of the management apparatuses according to the burden on the management apparatus; and (D) Transmitting, to the management apparatus, identification information on all devices newly allocated to each of the management apparatuses. Repeating in high speed these processing (A) to (D) by the allocation apparatus can maintain equality of the burden among the management apparatuses.

Along with the further increasing number of devices in the management system, however, it has become highly possible that the allocation apparatuses for the above-described processing (A) to (D) will be placed at increased risk of an excessive burden. The reason is as follows. First, the more the number of devices, the less equal the burden among the management apparatuses. It is therefore highly frequent to be in a situation where allocation of the devices for the management apparatuses needs to be changed. Next, the more the number of devices, the more the frequency of changes in the connection state between the device and the network. Furthermore, many recent networks use dynamic host configuration protocol (DHCP) to dynamically allocate an address to a device. Therefore, the more the number of devices, the more frequently their addresses change. Therefore, in order to maintain equality of the burden among the management apparatuses regardless of the increase in the number of devices, the allocation apparatus is required to further speed up the processing (A) to (D). Along with the increasing number of devices, however, the burden on the allocation apparatus increases, particularly for processing that constantly keeps identifying all devices on the network, and for processing that transmits the identification information on all of devices newly allocated to each of the management apparatuses each time the allocation is changed. As a result, further acceleration of the processing (A) to (D) may place the allocation apparatus at increased risk of an excessive burden.

SUMMARY OF THE INVENTION

An object of the present invention is to solve the above-described problem, and more particularly, to provide an allocation apparatus capable of rapidly performing processing of dynamically allocating the information processing devices to be managed to the management apparatuses, regardless of the number of the information processing devices.

To achieve the abovementioned object, according to an aspect, an allocation apparatus configured to allocate a plurality of information processing devices to two or more management apparatuses that perform distributed management of the plurality of information processing devices, the allocation apparatus reflecting one aspect of the present invention comprises: an allocation unit configured to allocate an address range on a network, allocatable to a plurality of information processing devices, to the two or more management apparatuses; and an acquisition unit configured to obtain, from each of the two or more management apparatuses, management information indicating a state of the information processing device whose address belongs to a range allocated to the management apparatus, wherein the allocation unit dynamically performs allocation of the address range on the network based on the management information that has been obtained by the acquisition unit.

The allocation apparatus preferably further includes an evaluation unit configured to evaluate the variation in the number of information processing devices to be managed among the two or more management apparatuses, based on the management information obtained by the acquisition unit. In this case, the allocation unit, by dynamically allocating the address range, preferably decreases the variation in the number of the information processing devices to be managed.

The allocation apparatus preferably further includes an evaluation unit configured to evaluate the variation in an importance level among two or more management apparatuses, based on the management information obtained by the acquisition unit. In this case, the allocation unit, by dynamically allocating the address range, preferably decreases the variation in the importance level.

The management information that has been obtained by the acquisition unit preferably includes an item for estimating an operation rate of the information processing device managed by each of the two or more management apparatuses. Then, the evaluation unit preferably estimates the operation rate of the information processing device managed by the management apparatus and uses an estimated value for evaluating the importance level of the management apparatus. In this case, this item preferably includes the number of users or utilization frequency of the information processing device for a predetermined period of time.

The management information that has been obtained by the acquisition unit preferably includes an item for evaluating the processing capacity of the information processing device managed by each of the two or more management apparatuses. Then, the evaluation unit preferably evaluates the processing capacity of the information processing device managed by the management apparatus and uses the evaluated value for evaluating the importance level of the management apparatus. In this case, this item preferably includes processing speed of the information processing device.

The evaluation unit preferably evaluates the importance level of each of the plurality of information processing devices, based on the management information that has been obtained by the acquisition unit. The evaluation unit preferably then causes the management apparatus that manages the information processing device that has higher importance level than any other information processing device among the plurality of information processing devices, to reduce a time interval of polling for the information processing device to be managed.

The evaluation unit preferably detects a management apparatus in which the number of information processing devices actually managed by the apparatus exceeds the manageable upper limit, from among the two or more management apparatuses, based on the management information that has been obtained by the acquisition unit. The evaluation unit preferably then causes the management apparatus to extend the time interval of polling for the information processing device to be managed.

The above-described allocation apparatus preferably has an additional function as one of the two or more management apparatuses. Furthermore, the address on the network is preferably an IP address.

To achieve the abovementioned object, according to an aspect, a method for allocating a plurality of information processing devices to two or more management apparatuses that perform distributed management of the plurality of information processing devices, the method reflecting one aspect of the present invention comprises: allocating an address range on a network, allocatable to a plurality of information processing devices, to the two or more management apparatuses; and obtaining, from each of the two or more management apparatuses, management information indicating a state of the information processing device whose address belongs to a range allocated to the management apparatus, wherein the method is implemented so as to dynamically allocate the address range on the network based on the management information.

To achieve the abovementioned object, according to an aspect, a non-transitory recording medium storing a computer readable program for allocating a plurality of information processing devices to two or more management apparatuses that perform distributed management of the plurality of information processing devices, the program reflecting one aspect of the present invention causes a computer to execute: allocating an address range on a network, allocatable to the plurality of information processing devices, to the two or more management apparatuses; obtaining, from each of the two or more management apparatuses, management information indicating a state of the information processing device whose address belongs to a range allocated to the management apparatus; and dynamically allocating the address range on the network based on the management information.

To achieve the abovementioned object, according to an aspect, a management system reflecting one aspect of the present invention comprises: a plurality of information processing devices; two or more management apparatuses configured to perform distributed management of the plurality of information processing devices; and an allocation apparatus configured to allocate the plurality of information processing devices to the two or more management apparatuses, wherein the allocation apparatus comprises: an allocation unit configured to allocate an address range on a network, allocatable to the plurality of information processing devices, to the two or more management apparatuses; an acquisition unit configured to obtain, from each of the two or more management apparatuses, management information indicating a state of the information processing device whose address belongs to a range allocated to the management apparatus, wherein the allocation unit dynamically performs allocation of the address range on the network based on the management information that has been obtained by the acquisition unit.

This management system preferably further includes a host computer that obtains, from the plurality of management apparatuses, information required for maintaining the plurality of information processing devices. In this management system, the plurality of information processing devices are preferably image forming devices.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5A illustrates management address ranges that have been initially allocated to three management apparatuses by an allocation apparatus illustrated in FIG. 1;

FIG. 5B illustrates devices whose IP addresses belong to the management address ranges illustrated in FIG. 5A;

FIG. 5C illustrates the management address range after being changed by the allocation apparatus;

FIG. 8B is a table illustrating the importance level of the management apparatus after the allocation apparatus has changed allocation of a reserved address range according to the importance level illustrated in FIG. 8A;

FIGS. 10A and 10B are schematic diagrams illustrating first and second stages of a method of dynamically allocating the reserved address range to the management apparatuses by the allocation apparatus of the third embodiment of the present invention when three management apparatuses are managing 70 devices at the moment, the manageable upper limit for the number devices being 20, 60, and 60, respectively;

FIGS. 12A and 12B are schematic diagrams illustrating first and second stages of a method of dynamically allocating the reserved address range to the management apparatuses by the allocation apparatus of the third embodiment of the present invention when three management apparatuses are managing 100 devices at the moment, the manageable upper limit for the number of devices thereof being 40, 50, and 60, respectively;

DESCRIPTION OF THE PREFERRED EMBODIMENTS

Hereinafter, an embodiment of the present invention will be described with reference to the drawings. However, the scope of the invention is not limited to the illustrated examples.

First Embodiment

A management system according to a first embodiment of the present invention monitors a plurality of image forming devices via a network for the purpose of maintenance of the apparatus. The maintenance includes billing for the use of printing or the like, a detection of a malfunction including out-of-paper, and reporting to an administrator. This management system distributes monitoring processing, in particular, to a plurality of management apparatuses.

[Configuration of Management System]

Figure 1:
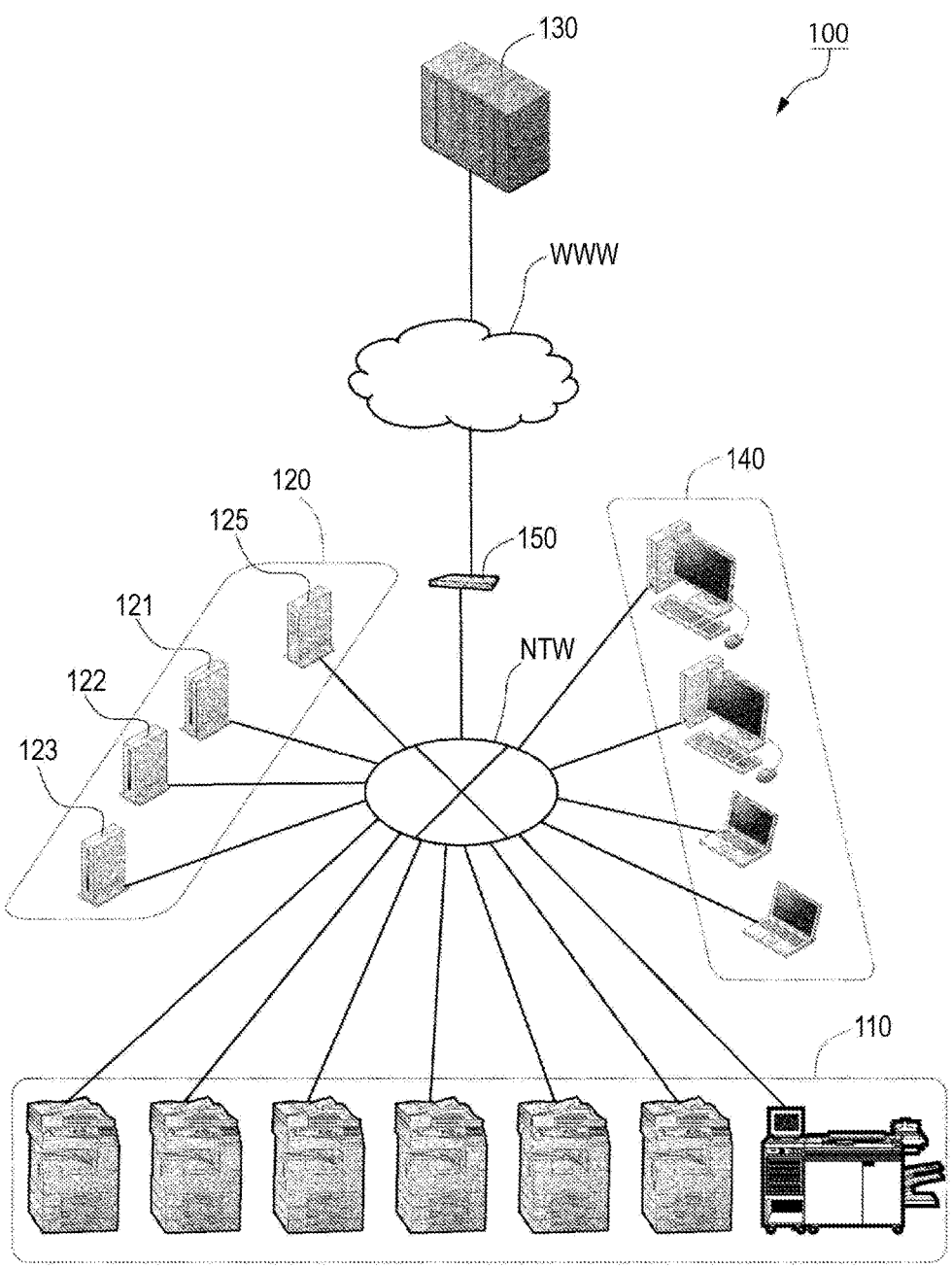
FIG. 1 is a network diagram of a management system according to a first embodiment of the present invention.

FIG. 1 is a network diagram illustrating a management system according to the first embodiment of the present invention. Referring to FIG. 1, the management system 100 includes a device group 110, a management apparatus group 120, and a center host 130.

The device group 110 is a device group to be managed by the management system 100 and includes a plurality of image forming devices such as a printer, a copier, a scanner, a FAX; or an MFP. The device group 110 is connected to a PC group 140 via a network NTW. The network NTW is a TCP/IP network, and, for example, is a local area network (LAN) provided at an office, an intranet dedicated to a company, or a virtual private network (VPN) using the Internet. Using the network NTW, the device group 110 receives an image data from the PC group 140 and prints the image data, or captures the image data from a manuscript and transmits the image data to the PC group 140.

The management apparatus group 120 includes a plurality of management apparatuses 121 to 123 and one allocation apparatus 125, and is connected to the device group 110 via the network NTW. Each of the apparatuses 121 to 123 and 125 operates when a general-purpose information processing device, including a PC, a server-dedicated device, executes specific software. Alternatively, each of the apparatuses 121 to 123 and 125 is a dedicated information processing device on which hardware such as an electronic circuit dedicated to a specific function has been incorporated. The management apparatuses 121 to 123 perform distributed management of the device group 110. Specifically, each of the management apparatuses 121, . . . , 123 monitors devices to be managed. The allocation apparatus 125 allocates an IP address range allocatable to the device group 110 as the address on the network NTW, to the management apparatuses 121 to 123. Consequently, each of the management apparatuses 121, . . . recognizes a device whose IP address belongs to the allocated range as a device to be managed.

The center host 130 is a PC, a server-dedicated device, or a mainframe, for example, and is connected to a wide area network WWW such as the Internet. To the wide area network WWW, the network NTW is also connected via a router 150. The center host 130 communicates with the management apparatus group 120 via the wide area network WWW, the router 150, and the network NTW.

[Functions of Management System]

Figure 2:
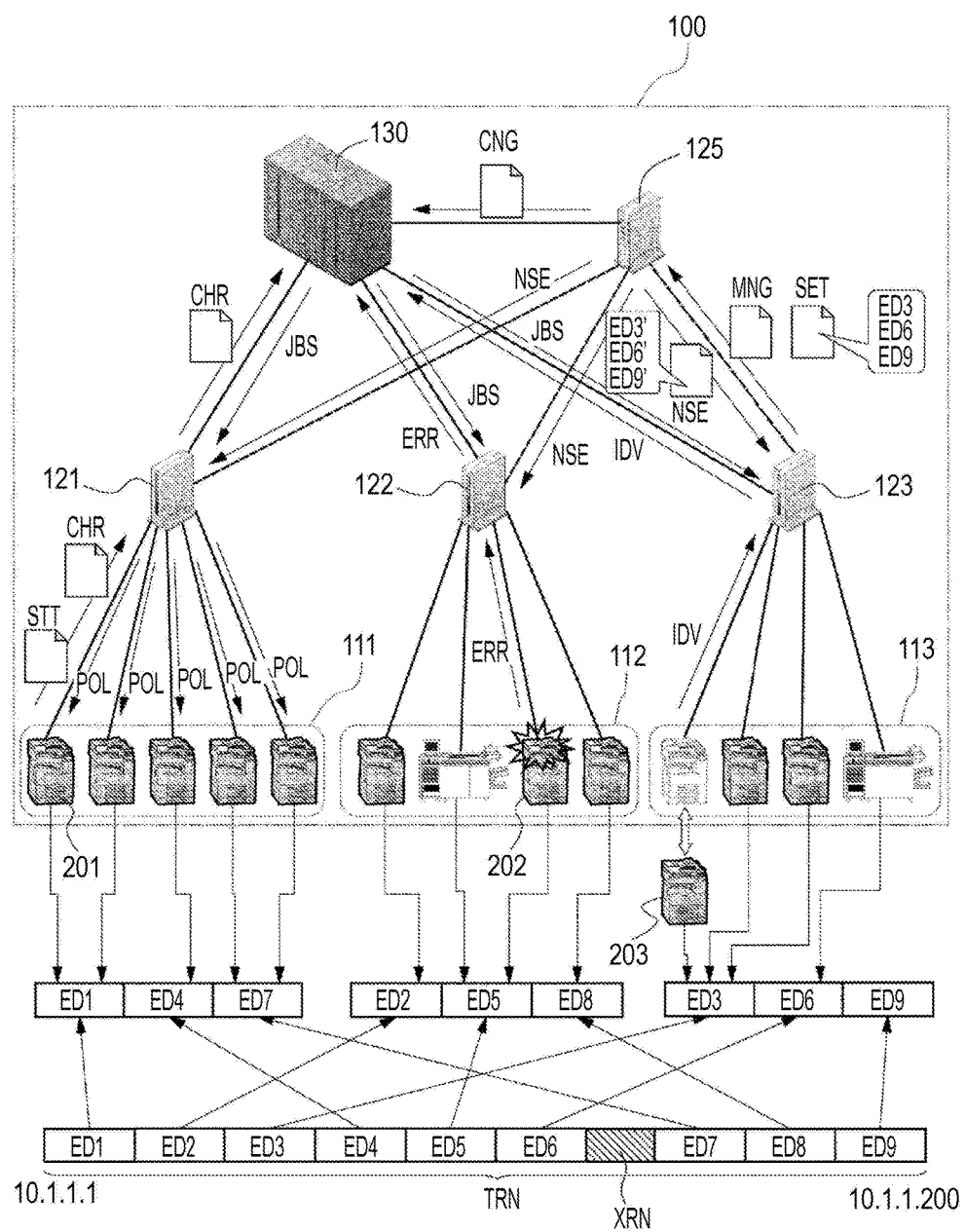
FIG. 2 is a schematic diagram illustrating a hierarchical structure of the management system illustrated in FIG. 1.

FIG. 2 is a schematic diagram illustrating a hierarchical structure of the management system 100. Referring to FIG. 2, the management system 100 includes three hierarchical layers. The bottom layer is configured with the device groups 111, 112, and 113 to be managed. The middle layer is configured with the direct management administrating bodies with respect to the bottom layer, that is, configured with the management apparatuses 121, 122, and 123. The top layer is configured with the control administrating bodies for the middle layer, that is, configured with the center host 130 and the allocation apparatus 125.

The allocation apparatus 125 allocates the range of the IP address allocatable to the device group 110 to the management apparatuses 121 to 123. This range is a set of IP addresses that has been reserved for the purpose of allocating to the device groups 111 to 113, either statically or by DHCP. Hereinafter, the range is referred to as a "reserved address range".

For example, a reserved address range TRN illustrated in FIG. 2 includes the IP addresses ranging from "10.1.1.1" to "10.1.1.200", excluding a non-target region XRN for allocation. The allocation apparatus 125 initially divides the range TRN into nine ranges each of which including substantially the same number of IP addresses, namely, substantially even nine regions ED1 to ED9. Herein, "substantially" means, when the number is not evenly divisible, the fraction is handled as to be within a tolerable range. The allocation apparatus 125 then allocates each three of the nine regions ED1 to ED9 to each of the management apparatuses 121, . . . , 123, as an address range to be managed. For example, a first region ED1, a fourth region ED4, and a seventh region ED7 are allocated to a first management apparatus 121. A second region ED2, a fifth region ED5 and an eighth region ED8 are allocated to a second management apparatus 122. A third region ED3, a sixth region ED6, and a ninth region ED9 are allocated to a third management apparatus 123.

Each of the management apparatuses 121, . . . , 123 recognizes a device whose IP address belongs to an address range as a device to be managed. Hereinafter, the address range to be managed that has been allocated to each of the management apparatuses is referred to as a "management address range" for the management apparatus. The first management apparatus 121 determines devices of a first group 111, whose addresses belong to the management address range ED1+ED4+ED7, as devices to be managed. The second management apparatus 122 assumes devices of a second group 112, whose addresses belong to the management address range ED2+ED5+ED8 as devices to be managed; and the third management apparatus 123 assumes devices of a third group 113, whose addresses belong to the management address range ED3+ED6+ED9 as devices to be managed.

Each of the management apparatuses 121, . . . , 123 monitors each of the devices of each of the groups 111, . . . , 113 by performing polling periodically for the device. Specifically, each of the management apparatuses 121, . . . transmits a polling signal POL sequentially to the IP addresses included in the management address ranges ED1+ED4+ED7, . . . . Frequency of transmitting the polling signal POL to the same IP address, namely, frequency of polling, may be, for example, once in 1 to 10 minutes.

When a request related to maintenance is arising in any of the devices, the device returns the request to the originating management apparatus in response to the polling signal POL. The management apparatus performs processing according to the request. This processing includes the following three kinds of processes. (1) acquisition of periodical information, (2) reporting of a malfunction, and (3) detection of a new device.

The "acquisition of periodical information" is processing of obtaining desired information CHR from the device groups 111 to 113 and transmitting it periodically to the center host 130. Examples of the information CHR to be obtained include information needed for billing for the use of device group 111 to 113, such as the number of printed sheet, the amount of spent/remaining toner or ink, operating time, or histories thereof. Each time the information is updated, each of the devices 201 sets information after update, or a difference between before/after update, as the information CHR to be transmitted to the management apparatus 121. Actual transmission of the information CHR is performed according to the polling signal POL from the management apparatus 121. The management apparatus 121, according to an instruction JBS from the center host 130, selects the information to be obtained from the device group 111, and determines the period for transmitting the obtained information CHR to the center host 130.

The "reporting of a malfunction" is processing of detecting a device 202 in which the malfunction has occurred from among the device groups 111 to 113, and reporting the malfunction to the center host 130. Examples of malfunctions to be detected include: malfunctions such as out-of-paper, out-of-toner, out-of-ink, paper jam, and includes failures of mechanical structures such as in a feeding unit, an image forming unit, a fixing unit, and a paper ejecting unit; and abnormalities in electric systems such as in an operating unit, a control unit, a communication unit, and a power source unit. Each of the devices 202, when a malfunction occurs, sets information ERR related to the malfunction to the management apparatus 122, as the information to be transmitted. Actual transmission of the information ERR is performed in response to the polling signal POL from the management apparatus 122. Each of the management apparatus 122, upon receiving the information ERR, transfers the information ERR and the identification information on the originating device to the center host 130.

The "detection of new device" is processing of detecting a device 203 that has been newly connected to the network NTW, from among the device groups 111 to 113, and notifying the center host 130 of the connection. Each of the devices 203, when connected to the network NTW, sets identification information IDV, such as an IP address of its own device, as the information to be transmitted to the management apparatus 123. Actual transmission of the identification information IDV is performed in response to the polling signal POL from the management apparatus 123. The management apparatus 123, immediately after receiving the identification information IDV on device, transfers the identification information IDV to the center host 130.

The center host 130 performs processing related to maintenance of the device groups 111 to 113 in response to the information CHR, ERR, and IDV transmitted from each of the management apparatuses 121, . . . , 123. Specifically, the center host 130 initially updates registration information related to the device groups 111 to 113 actually managed by the management apparatuses 121 to 123, particularly the IP address of each of the devices, each time the center host 130 receives the identification information IDV on the device from each of the management apparatuses 121 to 123, based on the identification information IDV. The center host 130, then, transmits the instruction JBS to each of the management apparatuses 121, . . . . The instruction JBS defines the information CHR to be periodically obtained from the already-registered device groups 111 to 113, and defines the time to transmit the obtained information CHR to the center host 130. Thereafter, the center host 130 performs billing processing for the use of the device groups 111 to 113 based on the information CHR periodically transmitted from each of the management apparatuses 121 to 123. Furthermore, the center host 130, immediately after it receives information ERR related to a malfunction from any of the management apparatuses 121 to 123, reads, from the information ERR, the identification information on the device with the malfunction and details of the malfunction, and notifies the administrator of them.

Furthermore, in the management system 100, the allocation apparatus 125 dynamically allocates the reserved address range to the management apparatuses 121 to 123. Specifically, the allocation apparatus 125 initially obtains management information MNG and setting information SET periodically, once a day, for example, from the management apparatuses 121 to 123. The management information MNG is information indicating states of the devices actually managed by each of the management apparatuses 121, . . . . The management information MNG includes items, for each of the devices, such as printing speed, the number of sheets printed for a fixed period of time (one day, for example), and the number of users. Each of the management apparatuses 121, . . . , 123 periodically obtains, by polling, information STT related to the state of the device required for creating management information MNG including these items, from the device whose IP address belongs to the management address range. The setting information SET is information indicating values of various parameters that defines operations of each of the management apparatuses. Examples of the items of the setting information SET include: management address range of the management apparatus, time interval for transmission of the polling signal POL by the management apparatus, (namely, time interval of polling), and the manageable upper limit for the number of devices managed by the management apparatus (hereinafter, referred to as a "manageable upper limit"). Based on the management information MNG and the setting information SET, the allocation apparatus 125 determines whether it is necessary to change management address range of the management apparatuses 121 to 123. If the change is necessary, the allocation apparatus 125 changes allocation of the reserved address range TRN for the management apparatuses 121 to 123. The allocation apparatus 125 also creates new setting information NSE that defines the management address range after the change, and delivers it to the management apparatuses 121 to 123. Each of the management apparatuses 121, . . . re-recognizes the device groups 111 to be managed . . . according to the new setting information NSE. After completion of the re-recognition by all the management apparatuses 121 to 123, the allocation apparatus 125 transmits a notification CNG on the change in the management address range, to the center host 130. The notification CNG represents the management address range after the change, or a difference between before and after the change. According to the notification CNG, the center host 130 initially updates the registration information related to the device to be managed. The center host 130, then, delivers a new instruction JBS to management apparatuses 121 to 123 based on the registration information after the update. The new instruction JBS defines the information CHR that should be periodically obtained from the device groups 111 to 113, indicated by the registration information after the update, and the time to transmit the obtained information CHR to the center host 130.

According to the first embodiment of the present invention, the allocation apparatus 125 monitors variation in the number of devices actually managed, among the management apparatuses 121 to 123. The allocation apparatus 125, when it detects the variation is excessive, changes the allocation of the reserved address range TRN for the management apparatuses 121 to 123 so as to decrease the variation. Details of the processing will be described later.

[Hardware Configuration of Management Apparatus]

Figure 3:
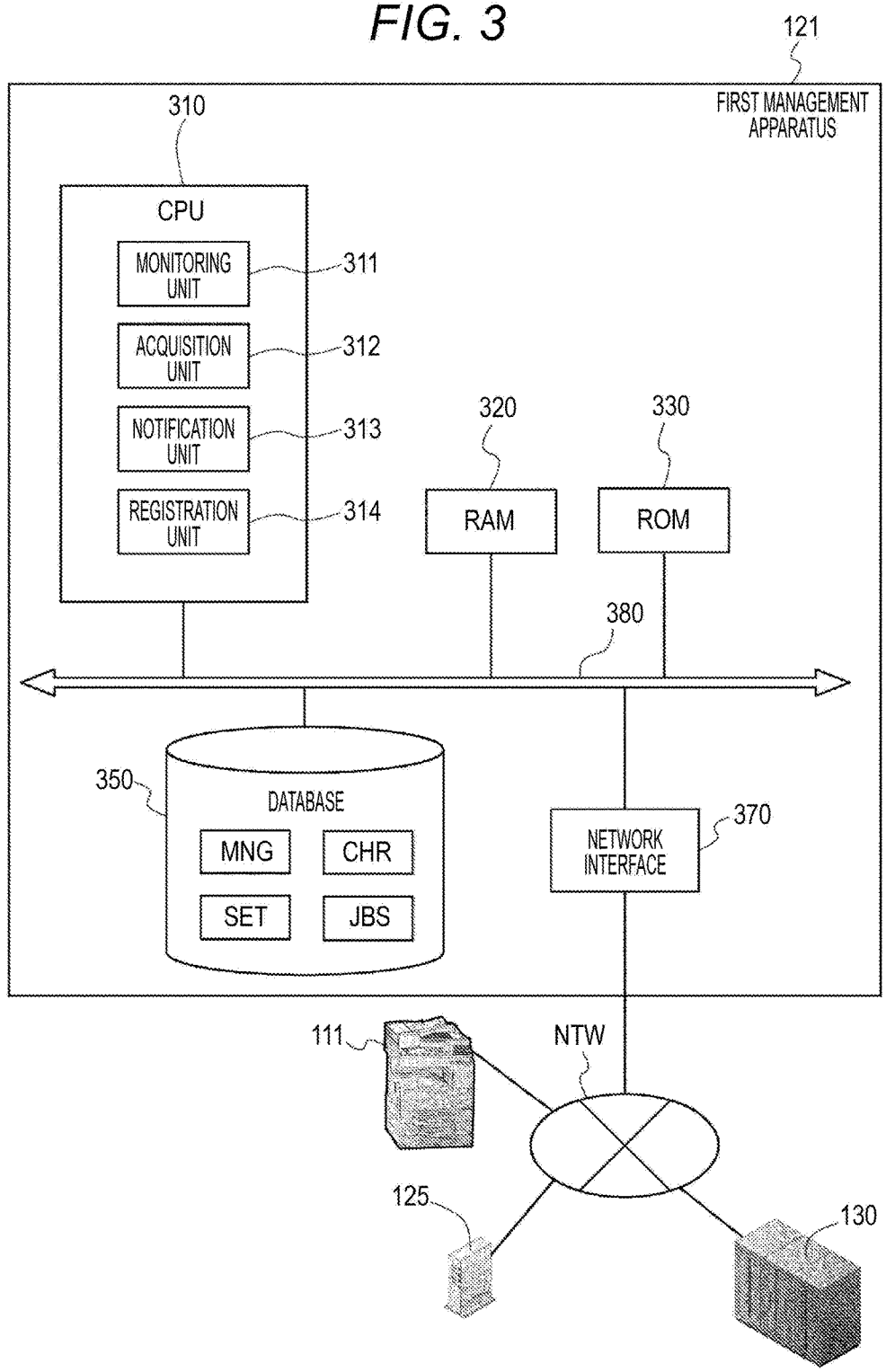
FIG. 3 is a block diagram illustrating a hardware configuration of the management apparatus illustrated in FIG. 1.

FIG. 3 is a block diagram illustrating a hardware configuration of the first management apparatus 121. This configuration is common to all the management apparatuses. That is, the configurations of the other management apparatuses 122 and 123 are similar to the configuration illustrated in FIG. 1.

Referring to FIG. 3, the first management apparatus 121 includes a CPU 310, a RAM 320, a ROM 330, a database 350, and a network interface 370. The components 310-370 are communicatively connected to each other via a bus 380.

The CPU 310, the RAM 320, and the ROM 330 are electronic circuits implemented on a substrate mounted on an inner portion of the first management apparatus 121. According to firmware, the CPU 310 controls the other components 320 to 370 connected to the bus 380. With this control, the CPU 310 executes particularly the above-described three types of processing as the management apparatus, namely, (1) acquisition of periodical information, (2) reporting of a malfunction, and (3) detection of a new device. The RAM 320 provides the CPU 310 with a working region used for executing the firmware by the CPU 310. The ROM 330 includes a write-inhibited semiconductor memory device and a rewritable semiconductor memory device such as an EEPROM. The former stores the firmware and the latter provides CPU 310 with a region for storing an environmental variable or the like.

The database 350, being a non-volatile mass storage device built in the first management apparatus 121, is an HDD or an SSD, for example. The database 350 stores the instruction JBS from the center host 130, the information CHR that has been defined by the instruction and that should be obtained, the management information MNG, and the setting information SET.

The network interface 370 is connected to the network NTW either by wire or wirelessly, and communicates with the device group 111 to be managed, the allocation apparatus 125, and center host 130 via the network NTW. The network interface 370 transmits the polling signal POL sequentially, in particular, to the IP addresses included in the management address range ED1+ED4+ED7, and receives information returned, in response, from the device group 111, namely, the information CHR to be obtained, information ERR related to a malfunction, the identification information IDV on device, and information STT on a state of device. The information CHR to be obtained is temporarily stored in the database 350. The information ERR related to the malfunction, and the identification information IDV on device are immediately transferred to the center host 130. Information STT related to the state of device is incorporated into the management information MNG and stored in the database 350. The network interface 370 transmits the management information MNG and the setting information SET from the database 350 to the allocation apparatus 125. The network interface 370 receives new setting information NSE from the allocation apparatus 125 and stores it in the database 350.

The network interface 370 further transmits periodically the information CHR to be obtained, from the database 350 to the center host 130, and at the same time, receives the instruction JBS from the center host 130 and stores it in the database 350.

[Functional Unit of Management Apparatus]

Referring further to FIG. 3, the CPU 310 operates as various kinds of functional units 311 to 314 according to the firmware, thereby executing the three kinds of processing. The functional units include a monitoring unit 311, an acquisition unit 312, a notification unit 313, and a registration unit 314.

The monitoring unit 311 has the network interface 370 periodically perform the polling for the device group 111. That is, the monitoring unit 311 transmits sequentially the polling signal POL to the IP address included in the management address range ED1+ED4+ED7.

The acquisition unit 312 selects the information CHR from the device group 111 according to the instruction JBS from the center host 130, and determines the period to transmit the obtained information CHR to the center host 130. The acquisition unit 312 subsequently verifies to the network interface 370 whether the information CHR to be obtained has been received from the device group 111 according to the polling signal POL, each time the monitoring unit 311 performs polling. When the reception of the information CHR has been verified, the acquisition unit 312 stores the information CHR temporarily in the database 350, and at the determined period of time, causes the network interface 370 to transmit the information CHR to the center host 130.

The acquisition unit 312 also verifies to the network interface 370 whether the information STT related to the state has been received from the device group 111 according to the polling signal POL, each time the monitoring unit 311 performs polling. When the reception of the information STT has been verified, the acquisition unit 312 incorporates the information STT into the management information MNG and stores it in the database 350. The acquisition unit 312 causes the network interface 370 to transfer the management information MNG from the database 350 to the allocation apparatus 125.

The notification unit 313 verifies to the network interface 370 whether information ERR related to a malfunction has been received from the device group 111 according to the polling signal POL, each time the monitoring unit 311 performs polling. When the reception of the information ERR has been verified, the notification unit 313 immediately causes the network interface 370 to transfer the information ERR and the identification information on the originating device, to the center host 130.

The registration unit 314 verifies to the network interface 370 whether the identification information IDV on device has been received according to the polling signal POL, each time the monitoring unit 311 performs polling. When the reception of the information IDV has been verified, the registration unit 314 causes the network interface 370 to transfer the information IDV to the center host 130 and at the same time, updates the management information MNG stored in the database 350 based on the information IDV, and registers the device indicated by the information MNG as a new device to be managed.

[Hardware Configuration of Allocation Apparatus]

Figure 4:
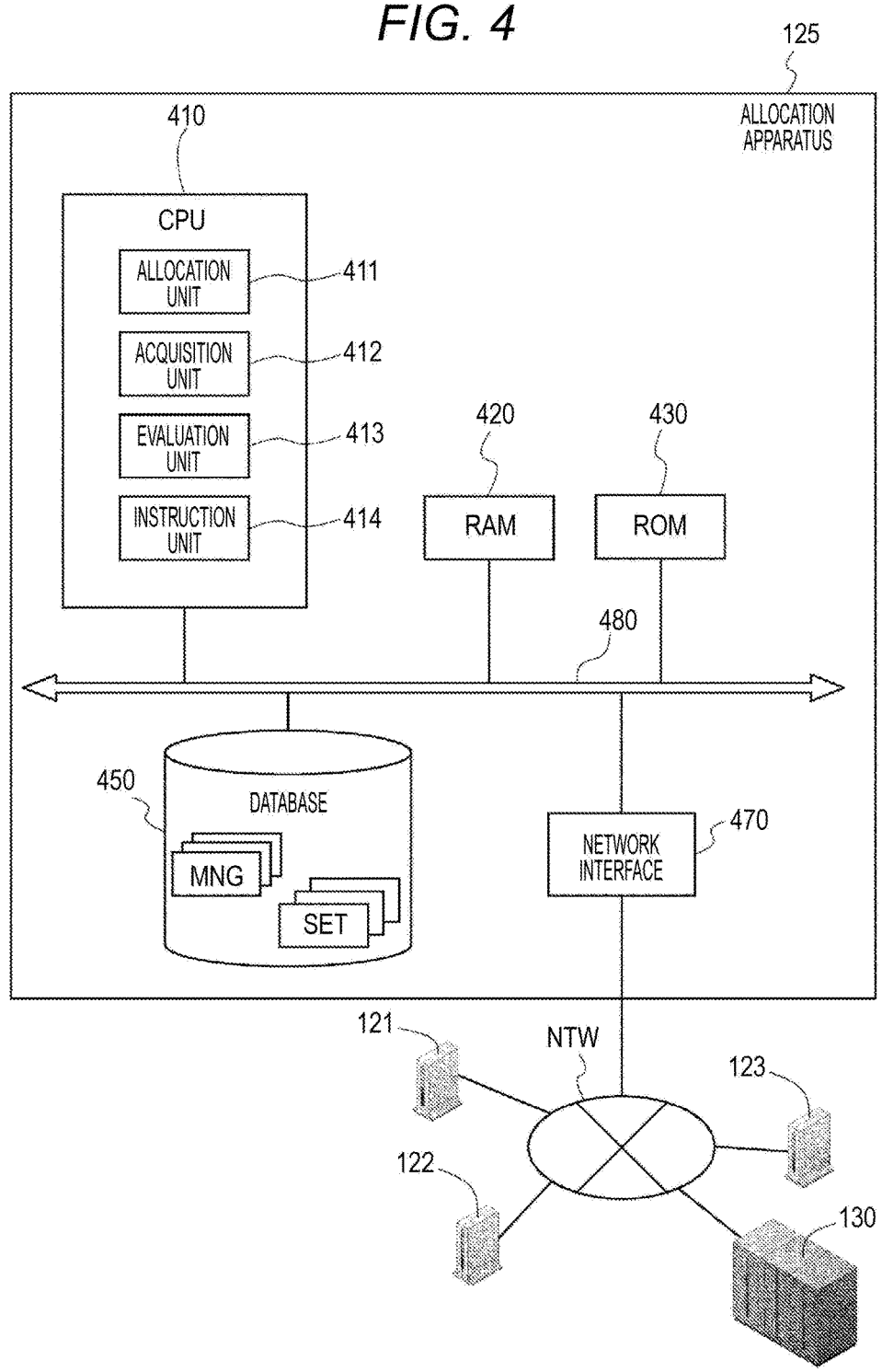
FIG. 4 is a block diagram illustrating a hardware configuration of the allocation apparatus illustrated in FIG. 1.

FIG. 4 is a block diagram illustrating a hardware configuration of the allocation apparatus 125. Referring to FIG. 4, the allocation apparatus 125 includes a CPU 410, a RAM 420, a ROM 430, a database 450, and a network interface 470. The components 410 to 470 are communicatively connected to each other via a bus 480.

The CPU 410, the RAM 420, and the ROM 430 are electronic circuits implemented on a substrate mounted on an inner portion of the allocation apparatus 125. According to firmware, the CPU 410 controls the other components 420 to 470 connected to the bus 480. With this control, the CPU 410 dynamically allocates the reserved address range TRN, in particular, to the management apparatuses 121 to 123. The RAM 420 provides the CPU 410 with a working region to be used when the CPU 410 executes the firmware. The ROM 430 includes a write-inhibited semiconductor memory device and a rewritable semiconductor memory device such as an EEPROM. The above-described write-inhibited semiconductor memory device stores firmware and the above-described rewritable semiconductor memory device provides the CPU 410 with a region for storing an environmental variable or the like.

The database 450, being a non-volatile mass storage device built in the allocation apparatus 125, may be an HDD or an SSD, for example. The database 450 stores the management information MNG obtained from the management apparatuses 121 to 123, and the setting information SET.

The network interface 470 is connected to the network NTW either by wire or wirelessly, and communicates with the management apparatuses 121 to 123 and the center host 130 through the network NTW. The network interface 470 obtains the management information MNG and the setting information SET from the management apparatuses 121 to 123, in particular, and stores them in the database 450. The network interface 470 further delivers new setting information NSE created by the CPU 410 to the management apparatuses 121 to 123. The network interface 470, additionally, transmits the change notification CNG of the management address range to the center host 130.

[Functional Unit of Allocation Apparatus]

Referring to FIG. 4, a CPU 410 operates as various kinds of function units 411 to 414 according to the firmware, thereby implementing dynamic allocation of the reserved address range TRN to the management apparatuses 121 to 123. The functional units include an allocation unit 411, an acquisition unit 412, an evaluation unit 413, and an instruction unit 414. The allocation unit 411 selects, from among the reserved address range TRN, the management address ranges ED1+ED4+ED7, . . . of each of the management apparatuses 121, . . . , and incorporates the information that defines the management address range into the setting information NSE to be transmitted to each of the management apparatuses 121, . . . . The acquisition unit 412 causes the network interface 470 to obtain periodically, once a day, for example, the management information MNG and the setting information SET from the management apparatuses 121 to 123. The evaluation unit 413 evaluates the burden on device management for each of the management apparatuses 121, . . . , based on the management information MNG and the setting information SET that have been obtained by the acquisition unit 412. Using this evaluation, the allocation unit 411 determines whether it is necessary to change management address range for each of the management apparatuses 121, . . . . Particularly when the burdens evaluated by the evaluation unit 413 are not equal (exceeding an allowable range) among the management apparatuses 121 to 123, the allocation unit 411 changes allocation of the reserved address range TRN such that the burdens will be equal (within an allowable range). The instruction unit 414 causes the network interface 470 to deliver the setting information NSE that defines the changed management address range to the management apparatuses 121 to 123. After all the management apparatuses 121 to 123 have completed recognition processing for the devices to be managed, based on the setting information NSE thereof, the instruction unit 414 causes the network interface 470 to notify the center host 130 of the management address ranges ED1+ . . . , . . . for each of the management apparatuses 121, . . . .

[Details of Method for Dynamically Allocating Reserved Address Range]

In the first embodiment of the present invention, the evaluation unit 413 initially evaluates the burden on each of the management apparatuses by the number of devices they actually manage. Next, the allocation unit 411 detects, from the evaluation, variation in the number of devices actually managed, among the management apparatuses, and changes allocation of the reserved address range for the management apparatuses such that the variation is decreased.

FIGS. 5A to 5C are schematic diagrams illustrating methods, used by the allocation unit 411, for dynamically allocating the reserved address range TRN to the three management apparatuses 121 to 123. FIG. 5A illustrates the management address ranges that have been initially allocated to the management apparatuses 121 to 123. FIG. 5B illustrates the device group 511 to 513 whose IP addresses belong to the management address ranges illustrated in FIG. 5A. FIG. 5C illustrates the management address ranges after being changed by the allocation apparatus 125.

On startup of the management system 100, the allocation unit 411 initially allocates the reserved address range TRN substantially evenly among the management apparatuses 121 to 123. For example, as illustrated in FIG. 5A, the reserved address range TRN is substantially evenly divided among nine regions ED1 to ED9 excluding the non-target region XRN for allocation. In this, three regions are allocated as the management address ranges to each of the management apparatuses 121, . . . .

It is typical that, among the management apparatuses 121 to 123, even when the sizes of the management address ranges (total number of IP addresses) are even, the number of devices whose IP addresses belong to each of the ranges, namely, the numbers of devices actually managed are not even. For example, as illustrated in FIG. 5B, the number of devices 511 whose IP addresses belong to the management address range ED1+ED4+ED7 of the first management apparatus 121 are "4"; the number of devices 512 whose IP addresses belong to the management address range ED2+ED5+ED8 of the second management apparatus 122 are "5"; the number of devices 513 whose IP addresses belong to the management address range ED3+ED6+ED9 of the third management apparatus 123 are "3".

The evaluation unit 413 evaluates the burden on the management apparatus by the number of devices 511, . . . actually managed by each of the management apparatuses 121, . . . . For example, the numbers "4", "5", and "3" of the devices 511, 512, and 513, illustrated in FIG. 5B are transmitted to the evaluation unit 413 through the management information MNG that has been created by each of the management apparatuses 121, 122, and 123. Based on these numbers of the devices, the evaluation unit 413 calculates the average value "4" for one management apparatus and determines the average value as the number of devices to be managed (hereinafter, referred to as a "target number for management") for the time when the burden on each of the management apparatuses 121, . . . is substantially equal.

The allocation unit 411 initially calculates, for each of the management apparatus 121, . . . , the deviation of the number of devices actually managed by each, from the target number for management. The allocation unit 411, then, changes allocation of the reserved address range for the management apparatuses 121 to 123 such that the deviations are decreased.

As illustrated in FIG. 5B, for example, the numbers of devices actually managed by each of the management apparatuses 121, 122, and 123 are "4", "5", and "3". Accordingly, deviations of the number of devices from the target number for management "4", for each, are "±0", "+1", "−1", respectively. Based on this deviation, the allocation unit 411 identifies the management apparatuses 122 and 123 for which the number of actually managed devices differs from the target number for management. The allocation unit 411, then, changes allocation of the management address ranges between the management apparatus 122, and 123 such that the numbers of devices whose IP addresses belong to the management address ranges after the change become equal to the target number for management. For example, as illustrated in FIGS. 5B and 5C, the eighth region ED8 and the ninth region ED9 are exchanged between the second management apparatus 122 and the third management apparatus 123. The number of devices whose IP address belong to the eighth region ED8 is "1" whereas the number of devices whose IP address belong to the ninth region ED9 is "0". Therefore, by exchanging regions ED8 and ED9, the number of devices that should be managed by each of the management apparatuses 122 and 123 becomes equal to the target number for management "4".

Since the regions ED8 and ED9 have the same size, management address range size of each of the management apparatuses 122 and 123, namely, the total number of IP addresses does not change between before and after the exchange of the regions. Therefore, each of the management apparatuses 121, . . . do not need to change the amount of resources to be prepared even when the allocations of the management address ranges are changed.

[Flow of Allocation Processing for Reserved Address Range]

Figure 6A:
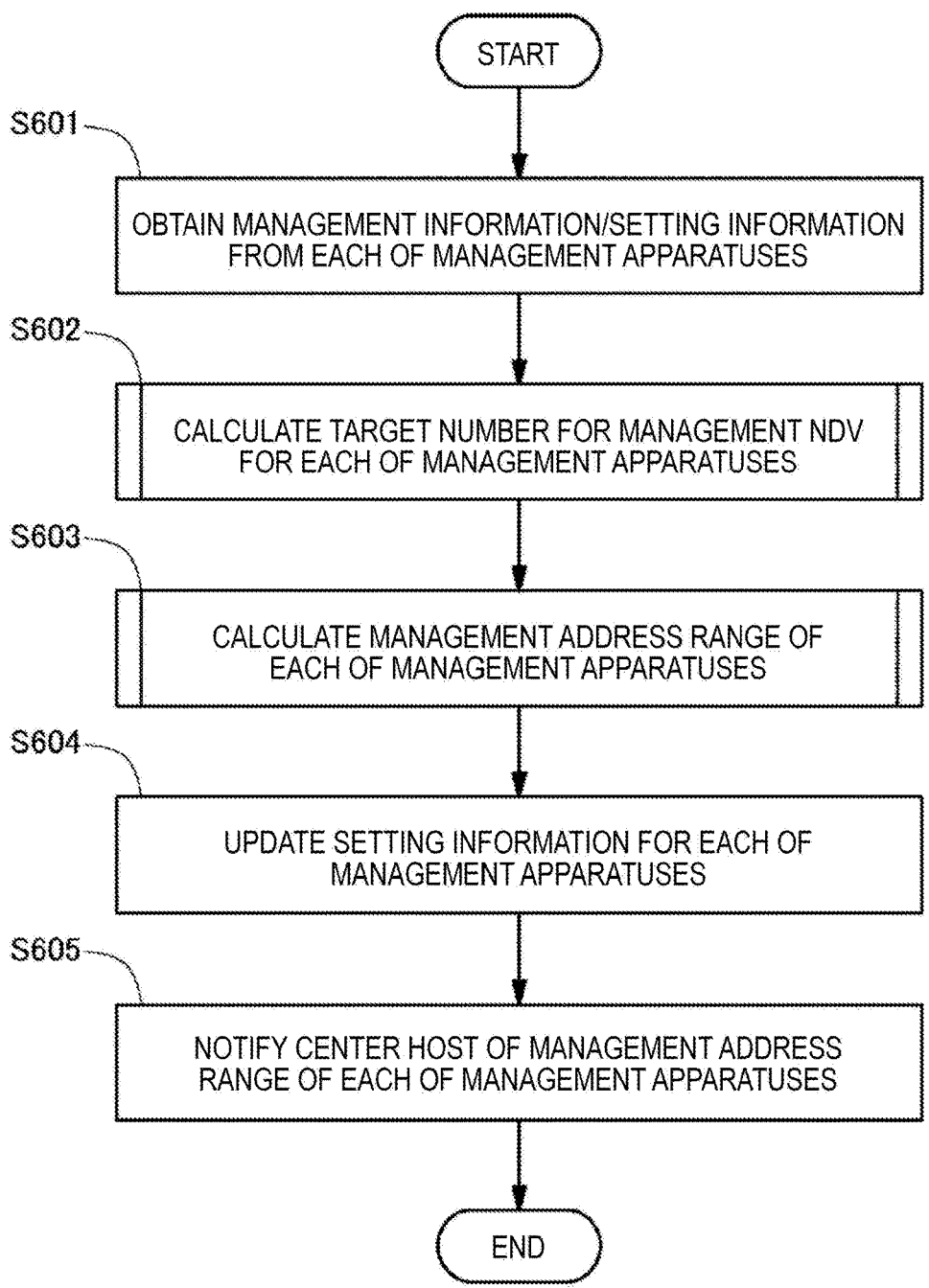
FIG. 6A is a flowchart of the allocation processing in a reserved address rage according to a first embodiment of the present invention.

FIG. 6A is a flowchart of the allocation processing for the reserved address range performed by the allocation apparatus 125. The processing is performed periodically, for example, once a day.

At step S601, the acquisition unit 412 obtains the management information MNG and the setting information SET from the management apparatuses 121 to 123. Thereafter, the processing proceeds to step S602.

At step S602, based on the management information MNG obtained at step S601, the evaluation unit 413 calculates a target number for management NDV for each of the management apparatuses 121, . . . . Thereafter, the processing proceeds to step S603.

At step S603, based on the target number for management NDV calculated at step S602, the allocation unit 411 calculates the management address range for each of the management apparatuses 121, . . . . Thereafter, the processing proceeds to step S604.

At step S604, the allocation unit 411 incorporates the information that defines the management address ranges calculated at step S603 into the new setting information NSE for each of the management apparatuses 121, . . . . The instruction unit 414 delivers the new setting information NSE to the management apparatuses 121 to 123. Thereafter, the processing proceeds to step S605.

At step S605, the instruction unit 414 notifies the center host 130 of the management address ranges calculated at step S603. Thereafter, the processing finishes.

Figure 6C:
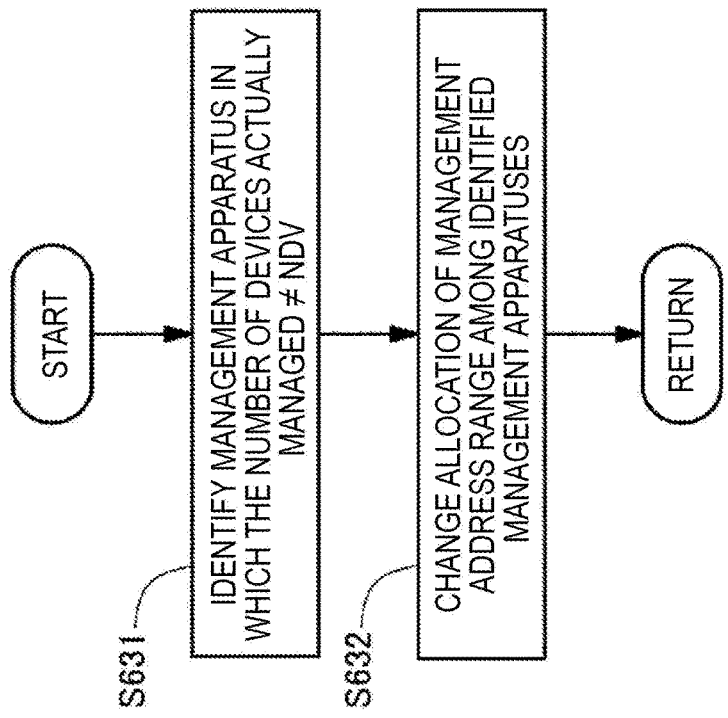
FIG. 6C is a flowchart of a subroutine of step S603 illustrated in FIG. 6A.
Figure 6B:
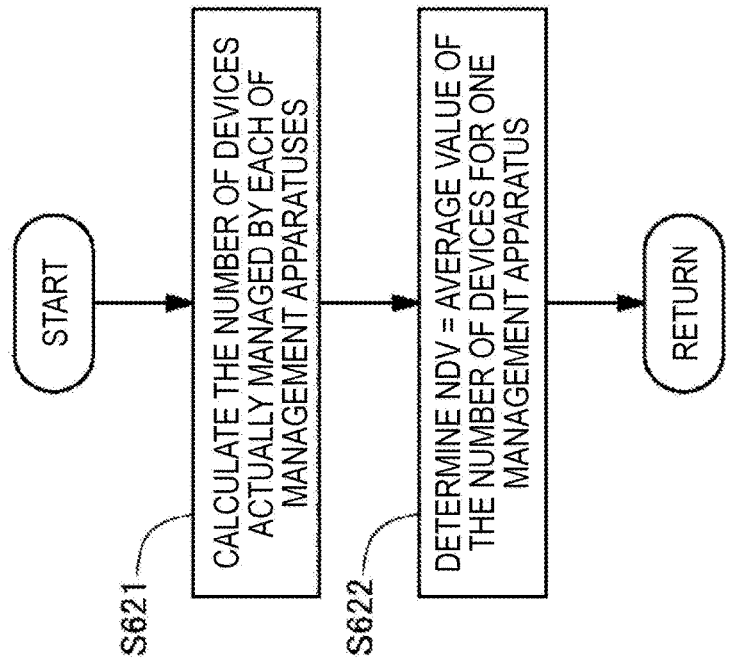
FIG. 6B is a flowchart of a subroutine of step S602 illustrated in FIG. 6A.

FIG. 6B is a flowchart of a subroutine of step S602, which is the step of calculating the target number for management NDV, illustrated in FIG. 6A.

At step S621, based on the management information MNG obtained at step S601, the evaluation unit 413 calculates the number of devices actually managed by each of the management apparatuses 121, . . . . Thereafter, the processing proceeds to step S622.

At step S622, the evaluation unit 413 calculates the average value of the number of devices for one management apparatus based on the number of devices obtained at step S621, and determines the average value as the target number for management NDV for each of the management apparatuses 121, . . . . Thereafter, the processing proceeds to step S603 illustrated in FIG. 6A.

FIG. 6C is a flowchart of a subroutine of step S603, which is the step of calculating the management address range, illustrated in FIG. 6A.

At the start of step S631, the allocation unit 411 calculates, for each of the management apparatuses 121, the difference between the number of devices obtained at step S612 and the target number for management NDV calculated at step S602. This difference is equal to the deviation from the target number for management NDV for the number of devices actually managed by each of the management apparatuses 121, . . . . The allocation unit 411 identifies the management apparatus whose deviation is not "0". Thereafter, the processing proceeds to step S632.

At step S632, the allocation unit 411 changes the allocation of the management address ranges among the management apparatuses that have been identified at step S631. Consequently, the allocation unit 411 sets the number of devices whose IP addresses belong to the management address ranges of those management apparatuses so as to be the same number as the target number for management NDV. Thereafter, the processing proceeds to step S604 illustrated in FIG. 6A.

[Data Flow in Allocation Processing for Reserved Address Range]

Figure 7:
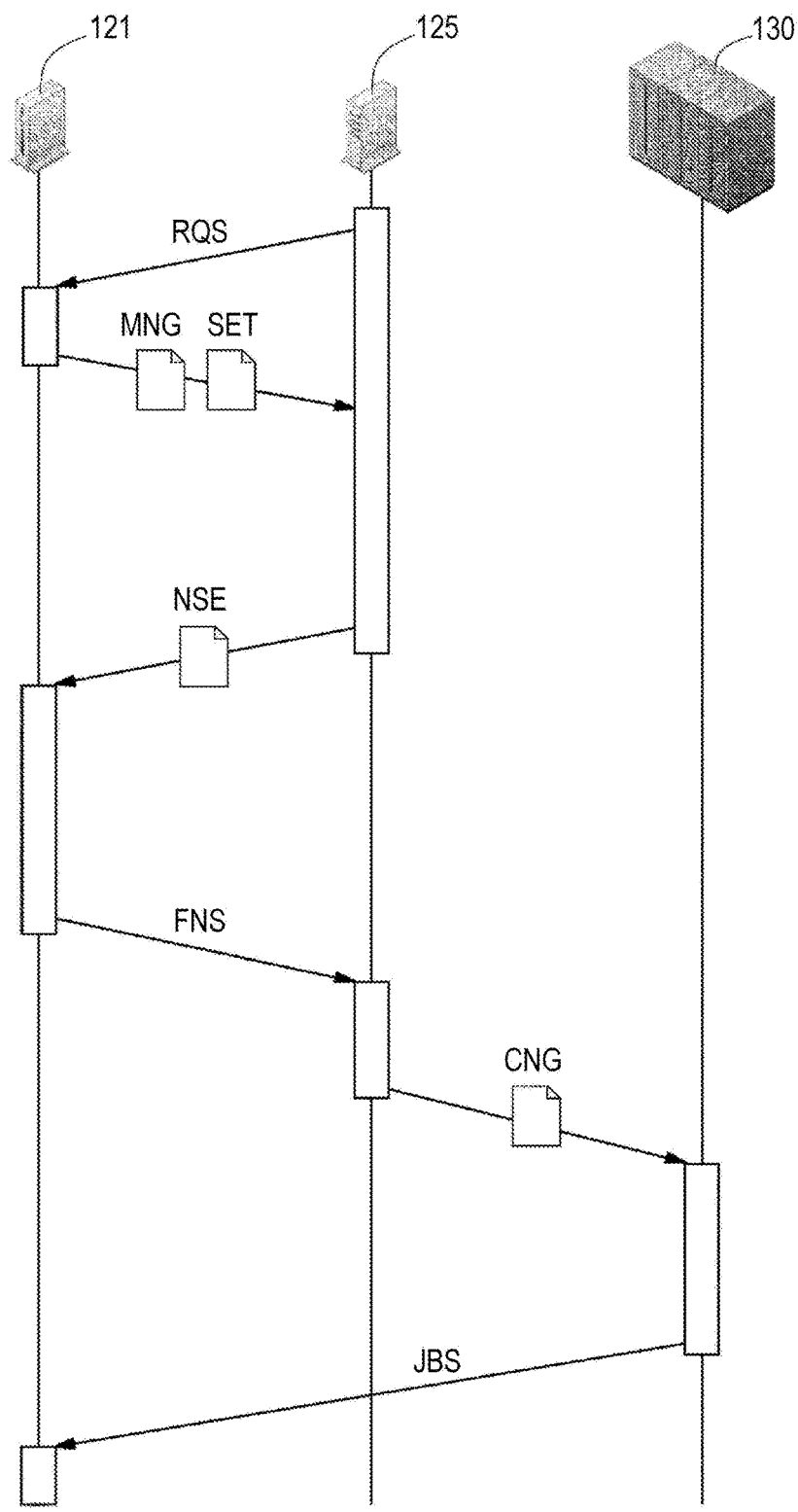
FIG. 7 is a sequence diagram illustrating data exchange, between apparatuses, to be executed in the allocation processing illustrated in FIG. 6A.

FIG. 7 is a sequence diagram illustrating data exchange, between apparatuses, to be executed in the allocation processing illustrated in FIG. 6A. Referring to FIG. 7, the allocation apparatus 125 delivers, at a start of allocation processing, to the management apparatus 121, a transmission request RQS for the management information and the setting information. In response to this request RQS, the management apparatus 121 transfers the management information MNG and the setting information SET obtained from the database 350, to the allocation apparatus 125. Based on the management information MNG and the setting information SET, the allocation apparatus 125 changes the management address range of the management apparatus 121, and then creates the new setting information NSE that defines the management address range after the change, and delivers it to the management apparatus 121. According to the new setting information NSE, the management apparatus 121 re-recognizes the device group to be managed. When re-recognition for all the devices are completed, the management apparatus 121 transmits a completion notification FNS to the allocation apparatus 125. In response to the completion notification FNS, the allocation apparatus 125 creates a notification CNG indicating the part of change in the management address range of the management apparatus 121, and transmits it to the center host 130. According to the notification CNG, the center host 130 updates the registration information related to the device to be managed, and distributes a new instruction JBS to the management apparatus 121 based on the updated registration information. According to the instruction JBS, the management apparatus 121 re-selects information that should be obtained from the devices whose IP addresses belong to the new management address range, and re-determines the period at which the obtained information should be transmitted to the center host 130.

[Advantages of First Embodiment]

The allocation apparatus 125 according to the first embodiment of the present invention initially allocates, as illustrated in FIG. 5A, the reserved address range TRN to the management apparatuses 121 to 123. This allocation differs from the allocation of real-time IP addresses of the device 511 to 513. If any change occurs to the connection state between the device 511 to 513 and the network NTW, the allocation need not be changed immediately. Therefore, the allocation apparatus 125 need not monitor the connection state. In particular, when a new device has been connected to the network NTW, the allocation apparatus 125 need not select the destination of allocation for the device, at least at the moment. As a result, it is possible to distribute detection processing for a new device to the management apparatuses 121 to 123, decreasing the burden on the allocation apparatus 125.

The allocation apparatus 125, when having detected variation in the number of devices to be managed among the management apparatuses 121 to 123, as illustrated in FIG. 5B, exchanges regions of management address ranges between the apparatuses so as to decrease the variation, as illustrated in FIG. 5C. Specifically, regions ED8 and ED9 of the management address ranges are exchanged between the management apparatuses 122 and 123 in which the number of devices to be managed differs from the target number for management. In changing the management address ranges by exchanging the regions, the allocation apparatus 125 is only required to deliver to the management apparatuses 121 to 123 information for identifying the regions ED8 and ED9, such as IP address of a boundary between the regions ED8 and ED9 to be exchanged. The amount of this information generally is largely decreased, with more number of devices, compared with the volume of identification information for all devices whose IP addresses belong to the regions to be exchanged, thereby decreasing the burden on the allocation apparatus 125 for the delivery processing of the information.

The allocation apparatus 125 also has arranged, in advance, the size of each of the regions ED1, . . . , ED9 to be divided from the reserved address range TRN such that the size becomes substantially even. Therefore, the size of the management address range of each of the management apparatuses 122 and 123, namely, the total number of IP addresses do not change between before and after the exchange of the regions. Consequently, the allocation apparatus 125 can change allocation of the reserved address ranges without causing resource shortage in any of the management apparatuses 121, . . . .

As described above, the allocation apparatus 125 dynamically allocates the reserved address range to the management apparatus according to variation in the number of devices to be managed, thereby decreasing the burden on the processing. The allocation apparatus 125 can thus rapidly execute the processing regardless of the number of devices to be managed, making it possible to equalize the number of devices to be managed rapidly among the management apparatuses.

[Modification of First Embodiment]

(A) A device group 110 to be managed are image forming devices. Other than the above, examples of the device groups to be managed may include a PC, a server-dedicated device, a mobile phone, a sensor, a security camera, a smart meter, an industrial robot, or an information appliance.

(B) The center host 130 performs processing related to maintenance of the device group 110 by using the management apparatus group 120. The center host 130 may further fetch image data from the device group 110 and perform processing to allow the fetched image data to be shared outside the network NTW.

(C) The center host 130 instructs the management apparatuses 121 to 123 on information needed in billing for the use of the device group 110, as the data to be obtained from the device group 110. Herein, the data to be obtained can be modified according to the type of device. For example, when the device is a PC, the data may be an operation test result on the PC. When the device is a sensor, the data can be output data from the sensor. When the device is a security camera, the data may be image data obtained by the camera.

(D) The allocation apparatus 125 is connected to the same network NTW as that of the management apparatuses 121 to 123. Alternatively, the allocation apparatus, similarly to the center host 130, may belong to a cloud system and be connected to the network NTW via a wide area network WWW such as the Internet. The allocation apparatus may an additional function as a management apparatus. On the contrary, each of a plurality of management apparatuses may have an additional function as an allocation apparatus and may operate in a predetermined order or randomly as the allocation apparatus, in addition to operating as a management apparatus.

(E) Implemented in a network NTW based on TCP/IP, the management system 100 uses the IP address range allocatable to the device group 110 to be managed as the address on the network NTW, for allocating the device group 110 to the management apparatuses 121 to 123. When the device group to be managed has determined the address other than an IP address as an address on a network, such as when the network is a USB network, the management system can use the reserved address range reserved for the address for allocating the device group to the management apparatuses.

(F) Each of the management apparatuses 121, 122 and 123 performs polling to monitor each of the device groups 111, 112, and 113, respectively. The management apparatus may alternatively monitor each of the devices by receiving an interrupted notification from any of the devices, each time a change in a connection state, or the like, occurs on the device.

(G) The allocation unit 411, as illustrated in FIGS. 5A to 5C, exchanges the regions ED8 and ED9 in the management address range between the management apparatuses 122 and 123, thereby changing allocation of the reserved address range for the management apparatuses 121 to 123. Alternatively, the allocation unit may change allocation of the reserved address range for the management apparatus by shifting the boundary of the regions that configure the management address range (refer to FIGS. 8A and 8B).

Second Embodiment

A management system according to a second embodiment of the present invention, similarly to management system 100 according to the first embodiment, causes a plurality of management apparatuses to monitor a plurality of image forming devices via a network for the purpose of maintenance thereof. In the management system 100 according to the first embodiment, the allocation apparatus 125 evaluates the burden on the management apparatuses 121 to 123 by the number of devices to be managed. In the management system according to the second embodiment, however, the allocation apparatus evaluates the burden on the management apparatus by an importance level thereof.

Hereinafter, the management system according to a second embodiment will be described. Note that description will be given on a part that differs from the case of the management system 100 according to the first embodiment. For the parts that are common in the first and second embodiments of the management system, description on the first embodiment may be incorporated herein by reference.

[Evaluating Importance Level of Management Apparatus]

According to the second embodiment of the present invention, similarly to the first embodiment, the evaluation unit 413 evaluates the burden on device management for each of the management apparatuses 121, 122, and 123, based on the management information MNG and the setting information SET that have been obtained by the acquisition unit 412. The second embodiment differs from the first embodiment in that, an importance level, instead of the number of devices actually managed, is used for evaluating the burden.

Figure 8A:
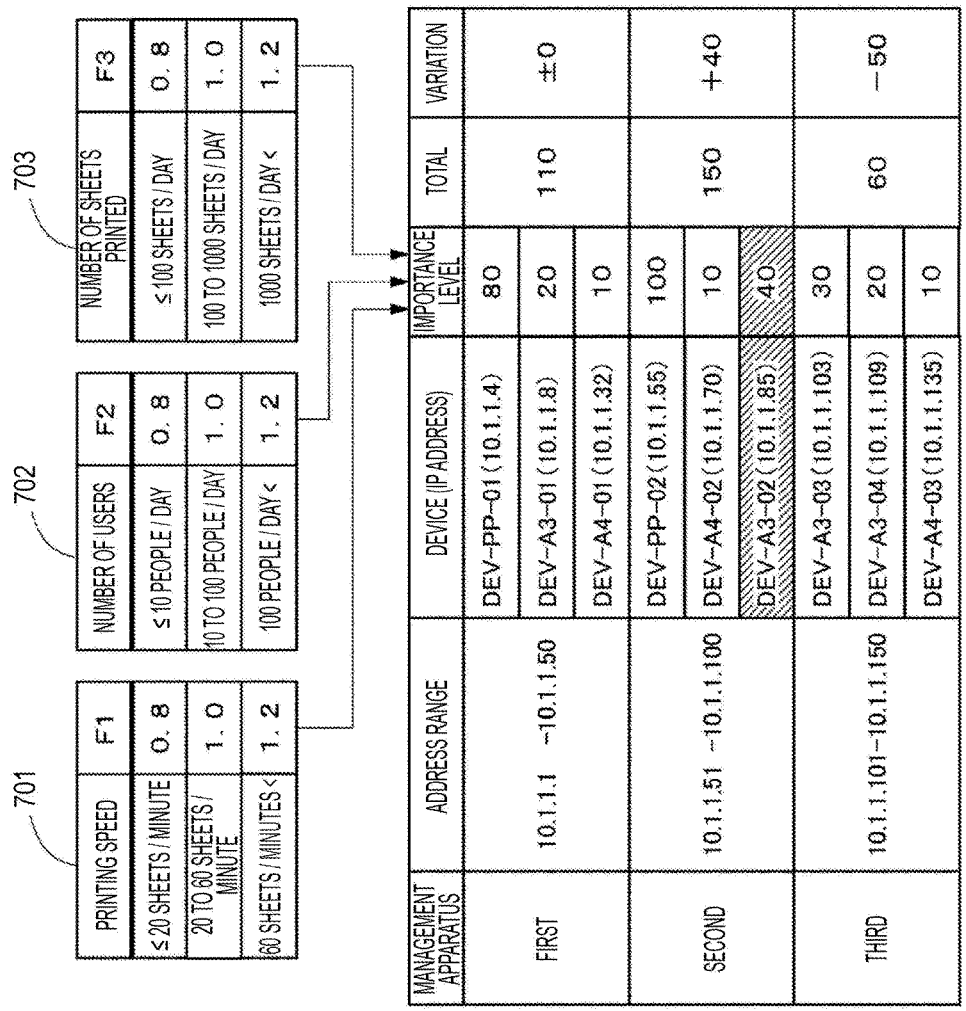
FIG. 8A is a table illustrating the importance level of the management apparatuses that have been evaluated by the allocation apparatus according to a second embodiment of the present invention.

FIG. 8A is a table illustrating the importance levels of the management apparatuses 121 to 123 that have been evaluated by the evaluation unit 413. This table indicates: an IP address group allocated as a group to be managed to each of the first management apparatus 121, the second management apparatus 122, and the third management apparatus 123, namely, a management address range; an identifier and an IP address of each of the devices, actually managed by each of the management apparatuses 121, . . . ; an importance level of each of the devices; a sum of the importance level of the devices for each of the management apparatuses 121, . . . ; and variation in the sum with respect to the average value.

The "importance level" of a device represents an index of the burden on the management apparatus when the apparatus manages the device. In evaluating this importance level, parameters for evaluating the processing capacity and the utilization frequency of the device are used. These parameters include, in particular, items such as printing speed of the device, the number of sheets printed and the number of users for a fixed period of time, that can be assumed to indicate higher processing capacity or higher utilization frequency when the value is larger. In this case, it is estimated that the larger these parameter values, the higher the operation rate of the device. In typical cases, the higher the operation rate of the device, the more frequently a malfunction found in the device, leading to frequent transmissions of the information ERR on the malfunction, from the same device to the management apparatus. Accordingly, it is considered that the larger the above-described parameter values for the device, the larger the burden for the management brought to the management apparatus. Therefore, a functional form for the importance level is provided such that the larger the above-described parameter values, the higher the importance level.

The acquisition unit 412 periodically receives a notification of these parameter values or information required for calculating the parameter values from the management apparatus, as part of the management information MNG. Based on the management information MNG, the evaluation unit 413 reads or calculates the above-described parameter values, and evaluates the importance level of each of the devices by using these values.

FIG. 8A depicts tables 701, 702 and 703 for converting the above-described parameters into the importance level. These tables 701 to 703 have been stored in advance in ROM 430 or in the database 450 of the allocation apparatus 125. The evaluation unit 413, referring to these tables 701 to 703, converts, for each of the devices, printing speed, the number of users, and the number of sheets printed, into components of the importance level, F1, F2, and F3. As indicated by these tables 701 to 703, the higher the printing speed, the larger the component F1; the more the number of users, the larger the component F2; and the more the number of sheets printed, the larger the component F3. The functional form for the importance level may be, for example, a product or (weighted) sum of the components F1, F2, and F3, being configured such that the larger the components F1, F2, and F3, the larger the resulting value. Accordingly, when the printing speed is higher, the number of users are larger, or the number of sheets printed are larger, the importance level is determined to be great.

After evaluating the importance level of each of the devices, the evaluation unit 413, according to the management address range of each of the management apparatuses 121, 122, and 123, indicated by the setting information SET, calculates the sum of the importance levels of the devices actually managed by each of the management apparatuses. The sum is determined as the importance level of each of the management apparatuses. According to FIG. 8A, for example, the importance level of the first management apparatus 121 is "110"; the importance level of the second management apparatus 122 is "150"; and importance level of the third management apparatus 123 is "60".

The evaluation unit 413 further obtains the variation in the importance level among the management apparatuses 121 to 123. Specifically, the average value of the importance level among the management apparatuses 121 to 123 is calculated first. Then, the deviation of the importance level for each of the management apparatuses 121, . . . from the average value is calculated. For example, according to FIG. 8A, the average value of the importance levels among the management apparatuses 121 to 123 is calculated as (110+150+60)/3≈110. The deviation of the importance level for each of the first to third management apparatus 121, 122 and 123, from the average value, is "±0", "+40", and "−50", respectively.

The allocation unit 411 determines the variation in the importance level among the management apparatuses 121 to 123 as the variation in the burden among the apparatuses. The allocation unit 411 then changes allocation of the reserved address range to the management apparatuses 121 to 123 so as to decrease the variation. According to FIG. 8A, for example, the importance level of the second management apparatus 122 is larger than the average value, whereas the importance level of the third management apparatus 123 is smaller than the average value. From this, it is determined that the burden on the second management apparatus 122 is larger than the average value, whereas the burden on the third management apparatus 123 is smaller than the average value. Therefore, the allocation unit 411 changes allocation of the management address range among the management apparatuses 122 and 123 such that the importance level of the second management apparatus 122 decreases and the importance level of the third management apparatus 123 increases. Specifically, among the devices managed by the second management apparatus 122, the importance level of "40" is allocated to the device whose IP address is the closest to the management address range "10.1.1.101" to "10.1.1.150" of the third management apparatus 123, namely, the device whose IP address is "10.1.1.85". Accordingly, the allocation unit 411, as illustrated in FIG. 8B, shifts the head of the management address range of the third management apparatus 123 to the IP address of the device, "10.1.1.85". Consequently, the importance level of the second management apparatus 122 decreases by "40" and the importance level of the third management apparatus 123 increases by "40". Accordingly, the deviation from the average value of the importance level in the second management apparatus 122 is eliminated and the deviation in the third management apparatus 123 decreases to "−10". Consequently, the allocation unit 411 shifts the boundary of the management address ranges of the management apparatuses 121 to 123, thereby decreasing the variation in the importance level among the management apparatuses 121 to 123.

[Flow of Allocation Processing for Reserved Address Range]

Figure 9:
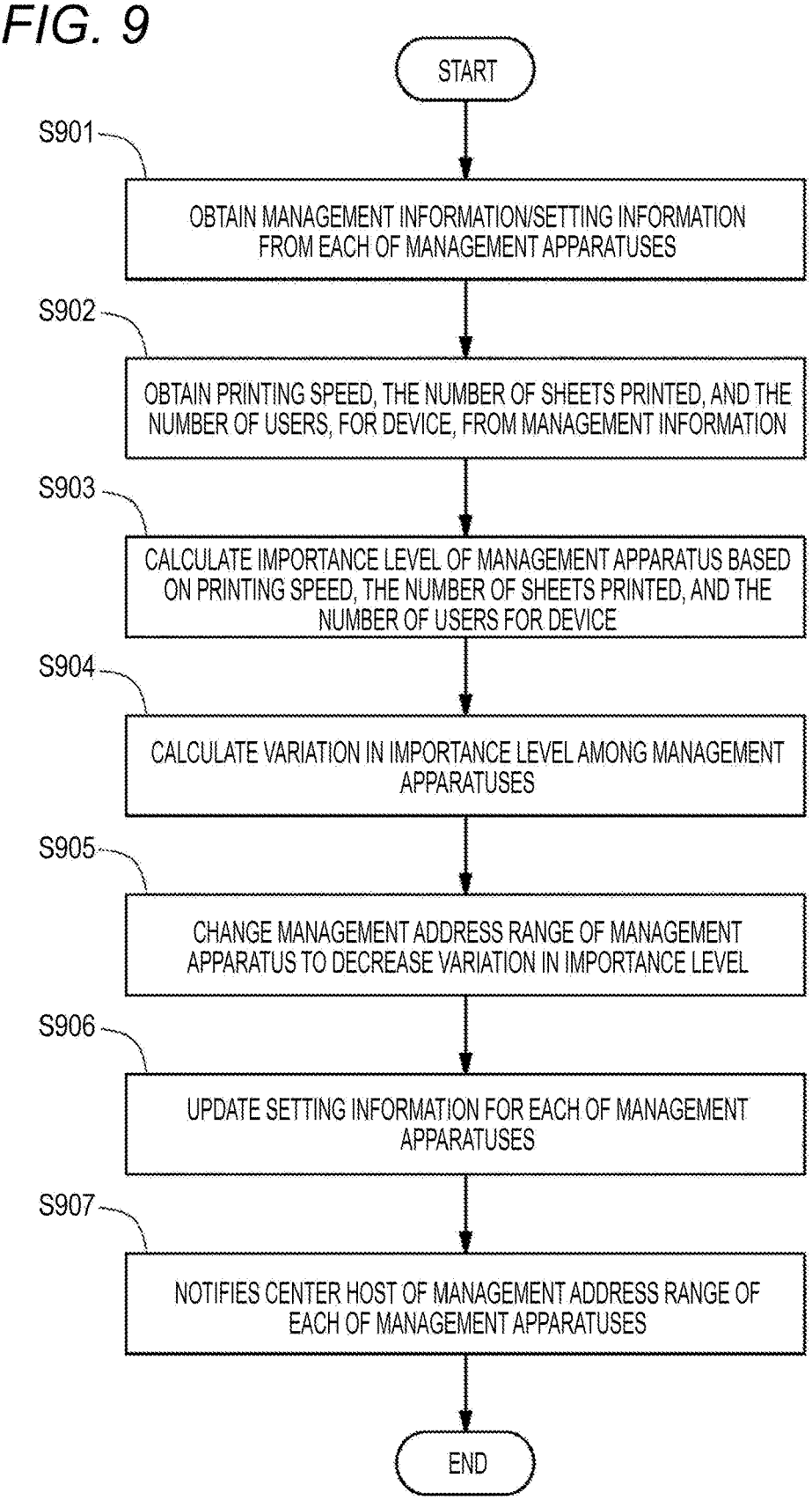
FIG. 9 is a flowchart of the allocation processing in a reserved address range according to the second embodiment of the present invention.

FIG. 9 is a flowchart of the allocation processing for a reserved address range according to the second embodiment of the present invention. The processing is performed periodically, for example, once a day.

At step S901, the acquisition unit 412 obtains the management information MNG and the setting information SET from the management apparatuses 121 to 123. Thereafter, the processing proceeds to step S902.

At step S902, based on the management information MNG obtained at step S901, the evaluation unit 413 reads or calculates parameter values for the device, including the printing speed, the number of sheets printed, and the number of users for a fixed period of time. Thereafter, the processing proceeds to step S903.

At the start of step S903, the evaluation unit 413 converts the parameter values obtained at step S902 into the components of the importance level, F1, F2, and F3, for each of the devices, with reference to tables 701 to 703 included in FIG. 8A. The evaluation unit 413 subsequently calculates a sum of the importance level of the device to be managed, for each of the management apparatuses according to the management address range of each of the management apparatuses 121, 122, and 123, indicated by the setting information SET, and sets the total value as the importance level of the management apparatus. Thereafter, the processing proceeds to step S904.

At step S904, the evaluation unit 413 calculates variation in the management apparatuses 121 to 123 based on the importance level thereof obtained at step S903. Specifically, the evaluation unit 413 initially calculates the average value of the importance level among the management apparatuses 121 to 123, and then, calculates the deviation of the importance level of each of the management apparatuses 121, . . . from the average value. Thereafter, the processing proceeds to step S905.

At step S905, the allocation unit 411 changes the management address range of each of the management apparatuses 121, . . . and decreases the variation in the importance level calculated at step S904. For example, the allocation unit 411, as illustrated in FIGS. 8A and 8B, the management apparatus 123 shifts the boundary of the management address range to the IP address of the device managed by another management apparatus 122. Consequently, the importance level of each of the management apparatuses 122 and 123 increases/decreases by the importance level of the device whose IP address is determined as the address on the network NTW, leading to a decreased deviation from the averages thereof. Thereafter, the processing proceeds to step S906.

At step S906, the allocation unit 411 incorporates information that defines the management address range that has been changed at step S905 into the new setting information NSE of each of the management apparatuses 121, . . . . The instruction unit 414 delivers the setting information NSE to the management apparatuses 121 to 123. Thereafter, the processing proceeds to step S907.

At step S907, the instruction unit 414 notifies the center host 130 of the management address range that has been changed at step S905. Thereafter, the processing finishes.

[Advantages of Second Embodiment]

In the second embodiment of the present invention, similarly to the first embodiment, the allocation apparatus 125 allocates the reserved address range to the management apparatuses 121 to 123. This allocation need not be changed immediately after the connection state has been changed between the device 110 and the network NTW. Therefore, the allocation apparatus 125 need not monitor the connection state. As a result, it is possible to distribute detection processing for a new device to the management apparatuses 121 to 123, decreasing the burden on the allocation apparatus 125.

According to the second embodiment of the present invention, unlike the first embodiment, the allocation apparatus 125 initially evaluates the importance level of each of the management apparatuses 121, . . . based on the management information MNG and the setting information SET. The allocation apparatus 125, when detecting variation in the importance level instead of variation in the number of devices to be managed among the management apparatuses 121 to 123, decreases the variation by shifting the boundary of the management address ranges among at least the two management apparatus 122 and 123. In shifting the boundary, the allocation apparatus 125 is only required to deliver to the management apparatuses 121 to 123 information for identifying the management address range after the change, such as IP address of the boundary after the change. Typically, the more the number of devices becomes, the amount of information largely decreases compared with the amount of identification information on all the devices whose IP addresses belong to the range of the changing boundary, thereby decreasing the burden on the allocation apparatus 125 for the delivery processing of the information.

As described above, the allocation apparatus 125 allocates the reserved address range to the management apparatuses, and shifts the boundary of management address range among the management apparatuses according to the variation in the importance level of the management apparatus, thereby decreasing the burden for the processing of dynamically delivering the devices to the management apparatuses. The allocation apparatus 125 can thus rapidly execute the processing regardless of the number of devices to be managed, making it possible to equalize the number of devices to be managed rapidly among the management apparatuses.

[Modification of Second Embodiment]

(A) The evaluation unit 413 uses, for evaluation of the importance level of a device, printing speed of the device, the number of sheets printed and the number of users for a fixed period of time. The parameters that can be used for evaluating this importance level are not limited to these. The parameters are only required to be the ones that can be determined, when they have larger values, to have higher device processing capacity or higher utilization frequency, including device operation time or a ratio of the operation time for a fix period of time (namely, operation rate).

(B) The allocation unit 411, as illustrated in FIGS. 8A and 8B, shifts the boundary of the management address ranges between the management apparatuses 122 and 123, thereby changing allocation of the reserved address ranges for the management apparatuses 121 to 123. Similarly to the first embodiment, the allocation unit may alternatively exchange regions in the management address ranges between the management apparatuses, thereby changing allocation of the reserved address ranges with respect to the management apparatuses. Specifically, as illustrated in FIG. 2, the allocation unit initially divides the reserved address range TRN substantially equally into the number of the regions ED1 to ED9, the number being the number of management apparatuses 121 to 123 or more, and then allocates those regions substantially evenly to each of the management apparatuses 121, . . . . Subsequently, as illustrated in FIGS. 5A to 5C, the allocation unit exchanges the regions ED8 and ED9 in the management address ranges between the specific management apparatuses 122 and 123. In this case, since the regions ED8 and ED9 have the same size, management address range size of each of the management apparatuses 122 and 123, namely, the total number of IP addresses is not changed between before and after the exchange of the regions. Consequently, the allocation unit can change allocation of the reserved address range without causing resource shortage in any of the management apparatuses 121, . . . .

Third Embodiment

The management system according to the third embodiment of the present invention, similarly to the management system 100 in the first embodiment, causes a plurality of management apparatuses to monitor a plurality of image forming devices via a network, for the purpose of maintenance thereof. When allocating the reserved address range to the management apparatuses, the allocation apparatus 125 according to the first embodiment divides the range into a plurality of regions ED1 and ED2, configured with substantially the same number of IP addresses. The allocation apparatus according to the third embodiment, however, divides the range into a plurality of regions such that the same number of IP addresses of the devices actually managed by the management apparatuses belong to the plurality of regions.

Hereinafter, the management system according to the third embodiment will be described. Note that the description will be given on a part that differs from the case of the management system 100 according to the first embodiment. For the parts that are common in the first and second embodiments of the management system, description on the first embodiment may be incorporated herein by reference.

[Dividing Address Range]

Figure 10B:
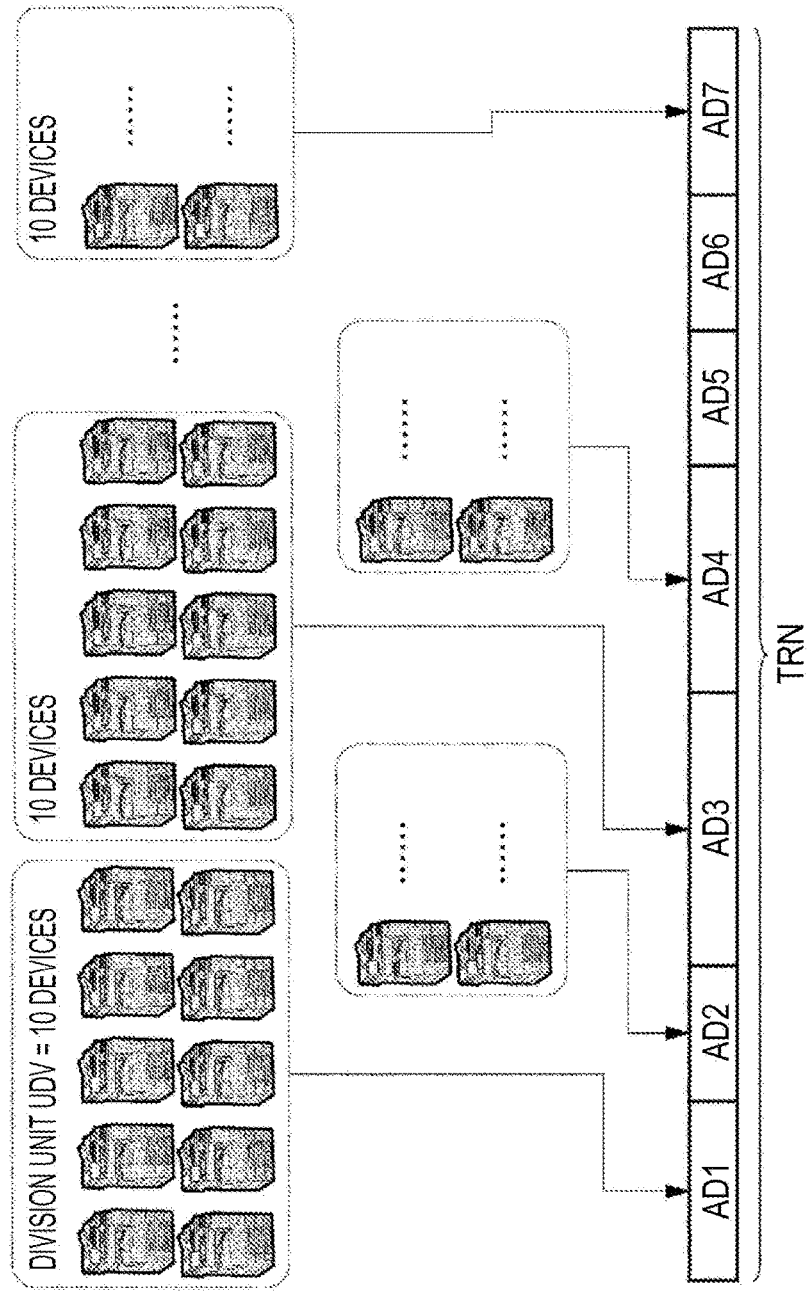
Figure 11A:
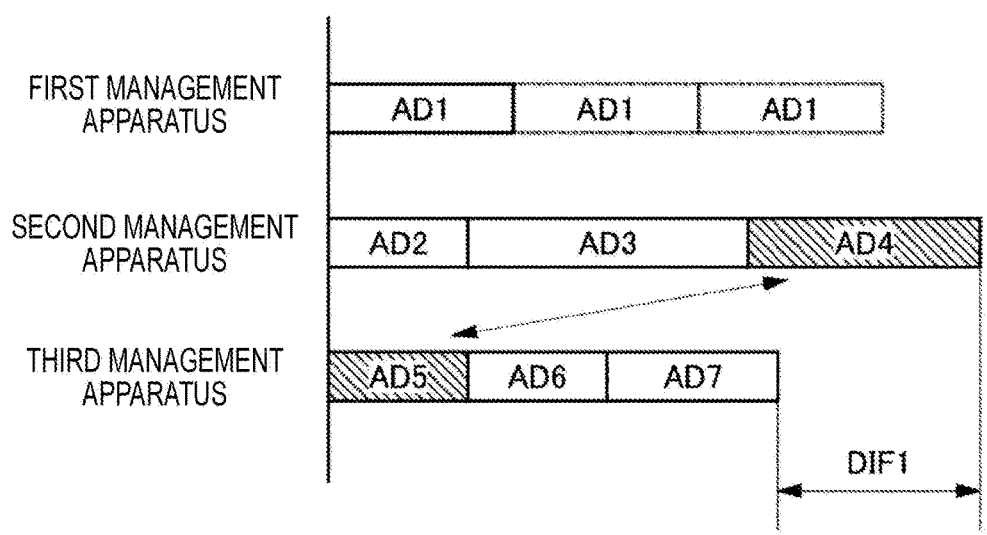
FIGS. 11A and 11B are schematic diagrams illustrating a third stage of the method the first and second stages thereof have been illustrated in FIGS. 10A and 10B.
Figure 11B:
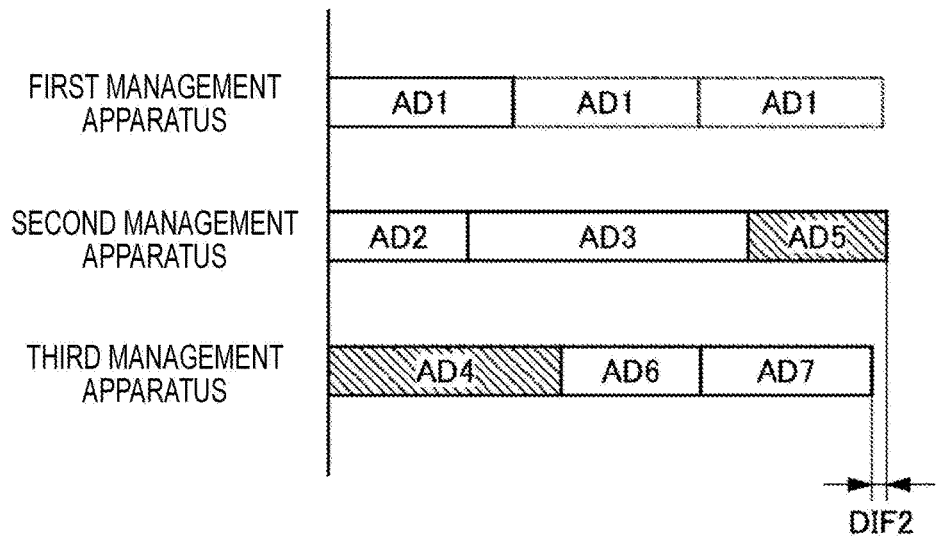

FIGS. 10 and 11 are schematic diagrams illustrating a method of dynamically allocating the reserved address range TRN to the management apparatuses 121 to 123 by the allocation apparatus 125 according to the third embodiment of the present invention when three management apparatuses 121, 122, and 123 manage 70 devices 700 at the moment, the manageable upper limit thereof being 20, 60, and 60, respectively. This method mainly includes three stages. FIG. 10A illustrates a first stage, namely, the stage for determining the target number for management NDV for each of the management apparatuses 121, . . . . FIG. 10B illustrates a second stage, namely the stage for dividing the reserved address range TRN in seven regions AD1 to AD7. To each of the regions, ten IP addresses (division unit=10) of the devices actually managed at the moment. FIGS. 11A and 11B illustrates a third stage, namely, the stage for allocating seven regions AD1 to AD7 illustrated in FIG. 10B into three management apparatuses 121 to 123.

—The First Stage—

Referring to FIG. 10A, the evaluation unit 413 of the allocation apparatus 125 initially reads, from the setting information SET of the management apparatuses 121 to 123, the manageable upper limit=20, 60, and 60, thereby calculating the manageable upper limit ratio=1:3:3. The evaluation unit 413, then, based on the management information MNG of the management apparatuses 121 to 123, obtains the total number=70 of the actually managed device 700. Subsequently, according to the manageable upper limit ratio 1:3:3, the evaluation unit 413 divides the total number "70" into 10, 30, and 30, and sets each of the numbers as the target number for management NDV respectively for each of the management apparatuses 121, 122, and 123.

—The Second Stage—

Referring to FIG. 10B, the allocation unit 411 of the allocation apparatus 125 divides the reserved address range TRN into the plurality of regions AD1 to AD7. A fixed number UDV of IP addresses of the device 700 actually managed at the moment by the management apparatuses 121 to 123 belong to each of the plurality of regions AD1 to AD7. Specifically, the allocation unit 411 initially determines the fixed number UDV (hereinafter, referred to as a "division unit") based on the target number for management NDV for each of the management apparatuses 121, . . . . For example, as illustrated in FIG. 10A, since the target number for management NDV=10, 30, and 30 are all equal to the integral multiple of the minimum value "10", the allocation unit 411 determines the division unit UDV as the minimum value "10". The allocation unit 411 then divides, in order from the beginning, the reserved address range TRN into seven regions AD1 to AD7, ten (division unit UDV=10) IP addresses of the device 700 belonging evenly to each of the seven regions AD1 to AD7.

The allocation unit 411 subsequently sets the number of regions NR such that the number of devices to be managed MDV does not exceed the target number for management NDV. NR represents the number of regions, in the seven regions AD1 to AD7, that should be determined as the management address range for each of the management apparatuses 121, 122, and 123. Specifically, the number of devices to be managed MDV equals to the value obtained from the division unit UDV=10 multiplied by the number of regions NR (MDV=10×NR). Therefore the number of regions NR, which should be determined as the management address range, for the first management apparatus 121, is set to "1" such that the number of devices to be managed MDV is the target number for management NDV=10 or less: MDV=10×1≤NDV=10. On the other hand, for the second management apparatus 122 and the third management apparatus 123, the number of regions NR, which should be determined as the management address range, is set to "3" such that the number of devices to be managed MDV is the target number for management NDV=30 or less: MDV=10×3≤NDV=30.

—The Third Stage—

The allocation unit 411 obtains the maximum and minimum values of the sizes among the management address ranges of the management apparatuses 121 to 123 for each combination of dividing seven regions AD1 to AD7 into the ratio of the set number of regions NR, 1:3:3. At this time, the allocation unit 411 applies weighting to those sizes using a ratio 3:1:1 that is an inverse ratio of the ratio 1:3:3 of the number of regions NR, so as to cancel the size difference attributed to the difference in the number of regions NR. Specifically, the allocation unit 411, as illustrated in FIG. 11A, compares the three-fold value of the size of the management address range of the first management apparatus 121, with the sizes of the management address ranges of the other management apparatuses 122 and 123.

The allocation unit 411 determines the difference between the maximum and minimum values of the sizes of the management address ranges for each combination of the seven regions AD1 to AD7, as the variation in the size, and compares the difference with the allowable upper limit of the variation. If any combination has a difference of the allowable upper limit or less, the allocation unit 411 allocates the seven regions AD1 to AD7 to the management apparatuses 121 to 123 in the same combination. On the other hand, if the difference exceeds the allowable upper limit in all combinations, the allocation unit 411 reduces the division unit UDV to one-half thereof (when not divisible, fraction is rounded off) and repeats the processing over from the second stage.

In the combinations of region as illustrated in FIG. 11A, the size of management address ranges AD2 to AD4 of the second management apparatus 122 is the maximum, and the size of management address ranges AD5 to AD7 of the third management apparatus 123 is the minimum. Accordingly, the allocation unit 411 determines the difference DIF1 therebetween as the variation in the size of the management address range, and compares the difference DIF1 with the allowable upper limit. Since the difference DIF1 exceeds the allowable upper limit, the allocation unit 411 changes the combination of the seven regions AD1 to AD7.

The combination of the regions as illustrated in FIG. 11B differs from the combination illustrated in FIG. 11A in that the fourth region AD4 and the fifth region AD5 have been exchanged. After this exchange, the size of the management address ranges AD2 to AD4 of the second management apparatus 122 is the maximum, and the size of the management address ranges AD5 to AD7 of the third management apparatus 123 is the minimum. Accordingly, the allocation unit 411 determines the difference DIF2 therebetween as the variation in the size of the management address range. However, the difference DIF2 is smaller than the difference DIF1 illustrated in FIG. 11A. When the difference DIF2 is the allowable upper limit or less, the allocation unit 411 determines to adopt the combination illustrated in FIG. 11B to be used for allocating the seven regions AD1 to AD7 to the management apparatuses 121 to 123. If the difference DIF2 also exceeds the allowable upper limit, the allocation unit 411 further changes the combination of the seven regions AD1 to AD7 and compares the variation in the size of the management address range with the allowable upper limit. In any of the combinations, when the variation exceeds the allowable upper limit, the allocation unit 411 reduces the division unit UDV=10 to "5", namely, one-half of 10, and repeats the processing over from the second stage.

Any of the regions AD1, . . . , AD7 includes the IP addresses, the number of which being the division unit UDV, of the device 700 actually managed by the management apparatuses 121 to 123 at the moment. Therefore, if a change exists only in the combination of seven regions AD1 to AD7 as illustrated in FIGS. 11A and 11B, the number of devices to be managed MDV is maintained at the setting value UDV×NR for any of the management apparatuses, and does not exceed the target number for management NDV: MDV≤NDV, in particular. As a result, the allocation unit 411, by repeating the second and third stages each time the division unit UDV is reduced, can suppress the variations (differences) DIF1 and DIF2 in the size of the management address range to the allowable upper limit or less, for any of the management apparatuses, while maintaining the number of the devices to be managed MDV, to the target number for management NDV or less.

[Details of Determination of Division Unit]

Unlike FIGS. 10A, 10B and FIGS. 11A, 11B, if the target number for management NDV for the management apparatus includes a value other than the integral multiple of the minimum value, the allocation unit 411 determines the division unit UDV as follows. This prevents the difference between the number of devices to be managed MDV and the target number for management NDV from exceeding the allowable range, for any of the management apparatuses.

FIGS. 12A and 12B are schematic diagrams illustrating the first and second stages of the method of dynamically allocating the reserved address range TRN to the management apparatuses 1221 to 1223 by the allocation apparatus 125 when three management apparatuses 1221, 1222, and 1223 are managing one hundred devices 1200 at the moment, the manageable upper limit thereof being 40, 50, and 60, respectively. FIG. 12A illustrates the first stage, that is the stage to determine the number of the target number for management NDV for each of the management apparatuses 1221, . . . . FIG. 12B illustrates the correspondence among the division unit UDV value calculated at determining the division unit UDV at the second stage, the number of devices to be managed MDV whose IP addresses belong to the management address range of each of the management apparatuses 1221, . . . and the deviation DEV of the number of devices to be managed MDV from the target number for management NDV.

—The First Stage—

Referring to FIG. 12A, the evaluation unit 413 initially reads, from the setting information SET of the management apparatuses 1221 to 1223, the manageable upper limit=40, 50, and 60, thereby calculating the ratio thereof=4:5:6. The evaluation unit 413, then obtains the total number of actually managed devices 1200, namely, TDV=100 based on the management information MNG of the management apparatus 1221 to 1223. According to the manageable upper limit ratio of 4:5:6, the evaluation unit 413 divides the total number of TDV=100 into 27, 33, and 40 (fraction has been rounded) and sets each number as the target number for management NDV of each of the management apparatuses 1221, 1222, and 1223.

—The Second Stage—

Referring to FIG. 12B, the allocation unit 411 initially selects the minimum value "27" from the target number for management NDV=27, 33, and 40 for each of the management apparatuses 1221, . . . , as the division unit UDV. The allocation unit 411 then, divides the reserved address range TRN into three regions such that each of the regions includes 27 (division unit UDV=27) IP addresses of the device 1200 actually managed by the management apparatuses 1221 to 1223 at the moment. A total of IP addresses of 27×3=81 of the devices 1200 belong to the three regions.

The allocation unit 411 proceeds to determine, from the three regions, the number of regions NR to be allocated to each of the management apparatuses 1221, 1222, and 1223 such that the number of devices to be managed MDV=UDV×NR does not exceed the target number for management NDV=27, 33, and 40, respectively. Then, the allocation unit 411 calculates deviation DEV=(NDV−MDV)/NDV of the number of devices to be managed MDV from the target number for management NDV. Referring to FIG. 12B, since the three regions are each allocated to the management apparatuses 1221 to 1223, the number of devices to be managed MDV for each of the three regions is "27". Accordingly, for the first management apparatus 1221, the deviation DEV=(27−27)/27=0%; for the second management apparatus 1222, the deviation DEV=(33−27)/33=18%; and for the third management apparatus 1223, the deviation DEV=(40−27)/40=33%. In a case where the allowable upper limit of the error is 20%, the deviation DEV=33% for the third management apparatus 1223 exceeds the allowable upper limit.

As such, the allocation unit 411 reduces the division unit UDV=27 to "13", namely, one-half of 27, and re-divides the reserved address range TRN. Consequently, the range TRN is divided into seven regions. Each of these seven regions includes 13 (the number of division unit UDV) IP addresses actually managed by the device 1200 at the moment, the total number of IP addresses for the seven regions being 13×7=91.

The allocation unit 411 subsequently determines, among these seven regions, the number of regions NR to be the management address range of each of the management apparatuses 1221, . . . , such that the number of devices to be managed MDV=UDV×NR does not exceed the target number for management NDV=27, 33, and 40, and obtains the deviation DEV=(NDV−MDV)/NDV from the target number for management NDV of the number of the devices to be managed MDV. Referring to FIG. 12B, since two regions are allocated to each of the first and second management apparatuses 1221 and 1222, the number of devices to be managed MDV is calculated as: 13×2=26 for each of the apparatuses. Since three regions are allocated to the third management apparatus 1223, the number of devices to be managed MDV is calculated as: 13×3=39 for the apparatus. Accordingly, for the first management apparatus 1221, the deviation DEV=(27−26)/27=4%; for the second management apparatus 1222, the deviation DEV=(33−26)/33=21%; and for the third management apparatus 1223, the deviation DEV=(40−39)/40=3%. In this, the deviation DEV=21% for the second management apparatus 1222 exceeds the allowable upper limit of 20%.

As such, the allocation unit 411 further reduces the division unit UDV=13 to "6", namely, one-half of 13, and re-divides the reserved address range TRN. Consequently, the range TRN is divided into 15 regions. Each of these 15 regions includes six (division unit UDV=6) IP addresses actually managed by the device 1200 at the moment, the total number of IP addresses for the 15 regions being 6×15=90.

The allocation unit 411 calculates the deviation DEV of the number of devices to be managed MDV from the target number for management NDV=27, 33, and 40, also for the 15 regions in a similar manner. Referring to FIG. 12B, the number of regions NR to be the management address range of each of the management apparatuses 1221, 1222, and 1223 is "4", "5", and "6", respectively. Accordingly, the number of devices to be managed MDV=UDV×NR is: 6×4=24, 6×5=30, and 6×6=36, respectively. Accordingly, the deviation DEV for each of the management apparatuses 1221, . . . is calculated as: (27−24)/27=11%, (33−30)/33=9%, (40−36)/40=10%. In this, any of the deviations DEV is the allowable upper limit of 20% or less. Therefore, the allocation unit 411 determines the division unit UDV as "6" and sets the number of regions NR to be the management address range of each of the management apparatuses 1221, . . . to "4", "5", and "6".

Herein, the total number of devices 1200=100 actually managed at the moment is larger than the number of devices whose IP addresses belong to the 15 regions=6×15=90. The allocation unit 411 allocates the remaining 10 devices (100−

90=10) to the management apparatus 1221 to 1223 such that the number of devices MDV to be managed does not exceed the target number for management NDV. Accordingly, the remaining number of devices=10 is divided into "3", "3", "4" and added to the number of devices to be managed MDV for each of the management apparatuses 1221, 1222, and 1223.

As such, the division unit UDV and the number of regions NR have been determined such that, for each of the management apparatuses, deviation DEV between the number of devices to be managed MDV and the target number for management NDV is the allowable upper limit or less. Thereafter, the allocation unit 411 proceeds with the processing to the third stage.

[Flow of Allocation Processing for Reserved Address Range]

Compared with the processing in the first embodiment as illustrated in FIG. 6A, the allocation processing of the reserved address range according to the third embodiment of the present invention differs in detail at steps S602 and S603. Processing is similar for the other steps.

Hereinafter, the allocation processing according to a third embodiment will be described. Note that description will be given on a part that differs from the processing according to the first embodiment. For the parts that are common in both allocation processing, description on the first embodiment may be cited.

—Step S602, Calculating Target Number for Management—

Figure 13:
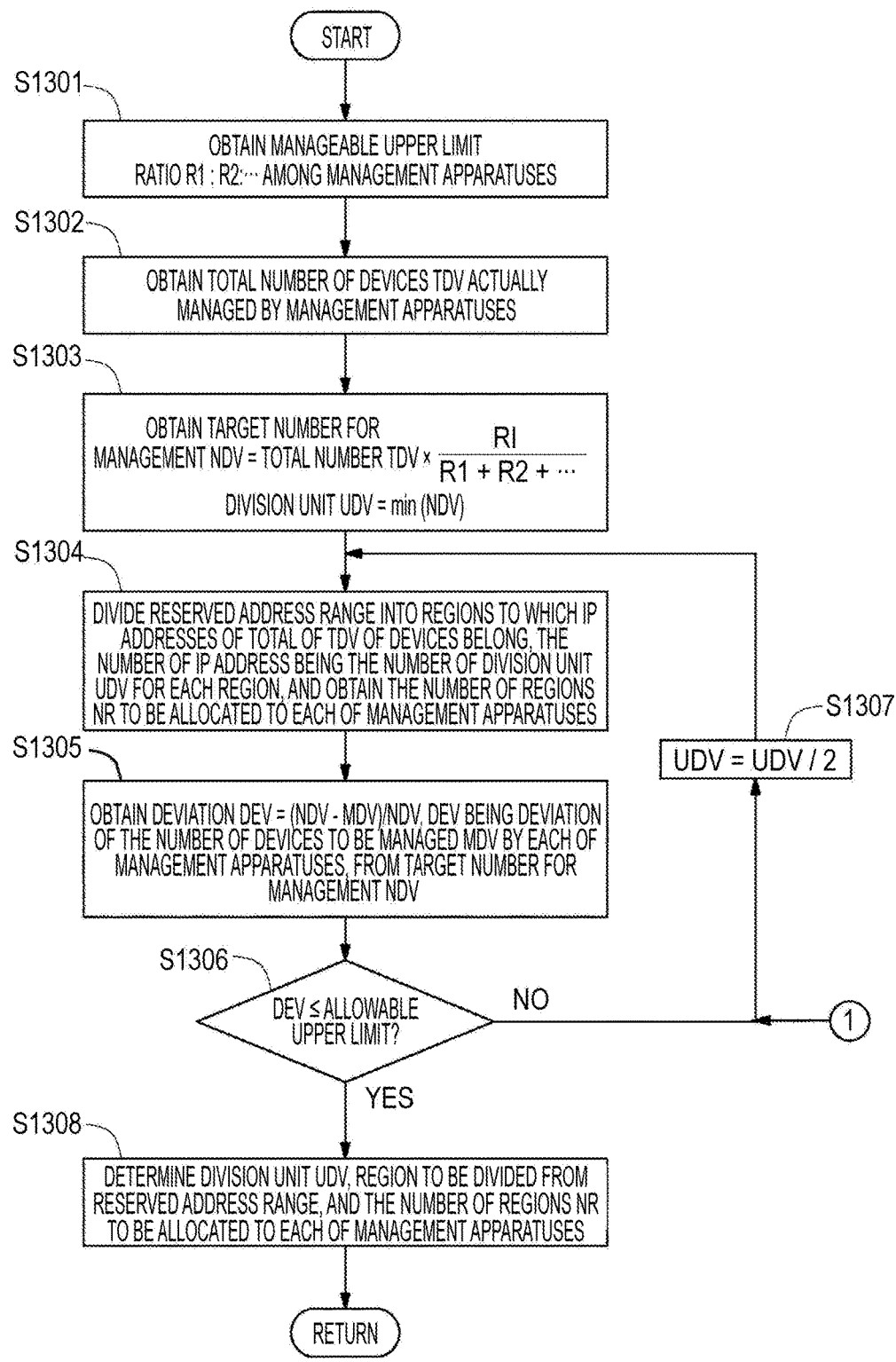
FIG. 13 is a flowchart illustrating steps of calculating the number of devices to be managed by each of the management apparatuses, the devices included in the allocation processing in the reserved address range according to the third embodiment of the present invention.

FIG. 13 is a flowchart of step S602, namely, the step of calculating the target number for management NDV for each of the management apparatuses, illustrated in FIG. 6A.

At step S1301, the evaluation unit 413 reads the manageable upper limit from the setting information SET for the management apparatus, obtained at step S601, and calculates the ratio thereof=R1:R2: . . . . Thereafter, the processing proceeds to step S1302.

At step S1302, based on the management information MNG obtained at step S601, the evaluation unit 413 calculates the total number of devices TDV actually managed by the management apparatuses. Thereafter, the processing proceeds to step S1303.

At the start of step S1303, the evaluation unit 413 divides the total number of devices TDV obtained at step S1302, according to the manageable upper limit ratio R1:R2: . . . , and temporarily sets them as the target number for management, for each of the management apparatuses. Herein, the target number for management NDV [i] for the i-th (i=1, 2, 3, . . . ) management apparatus is calculated by the following equation (1).

[Mathematic Expression 1]

$$NDV[i] = TDV \times \frac{Ri}{R1 + R2 + \cdots} \qquad (1)$$

Herein, a fraction smaller than one included in the target number for management NDV [i] will be rounded.

Next, the allocation unit 411 temporarily sets the division unit UDV as the minimum value of the target number for management NDV [i]: UDV=min (NDV [i]). Thereafter, the processing proceeds to step S1304.

At the start of step S1304, the allocation unit 411 divides the reserved address range TRN into regions such that the IP addresses of the devices actually managed by the management apparatus at the moment, each quantity thereof being the number of the division unit UDV, belong to each of the regions. The allocation unit 411 then determines the number of devices to be allocated to the i-th management apparatus from these regions, namely, the number of regions NR [i] to be included in the management address range, such that the number of devices to be managed MDV [i] does not exceed the target number for management NDV [i]. That is, since the number of devices to be managed MDV [i] is a product of the division unit UDV and the number of regions NR [i] within the management address range, the target number for management NDV [i] satisfies the following equation: MDV [i]=UDV×NR [i] NDV [i]. Thereafter, the processing proceeds to step S1305.

At step S1305, the allocation unit 411 calculates the deviation DEV [i]=(NDV [i]−MDV [i])/NDV [i], that is, a deviation of the number of devices MDV [i] whose IP addresses belong to the regions of the number NR [i] determined at step S1304, from the target number for management NDV [i]. Thereafter, the processing proceeds to step S1306.

At step S1306, the allocation unit 411 compares the deviation DEV [i] (i=1, 2, 3, . . . ) calculated at step S1305, with the allowable upper limit. When any error exceeds the allowable upper limit, the processing proceeds to step S1307; when all of the errors are the allowable upper limit or less, the processing proceeds to step S1308.

Since any one or more deviation DEV [•] exceeds the allowable upper limit, the allocation unit 411, at step S1307, reduces the division unit UDV to one-half of the existing unit. Thereafter, the processing is repeated from step S1304.

At step S1308, since any of the deviations DEV [i] (i=1, 2, 3, . . . ) is the allowable upper limit or less, the allocation unit 411 determines the current value as the division unit UDV, determines the current region as the region to be divided from the reserved address range TRN, and determines the current value NR [i] as the number of the regions to be the management address range for each of the management apparatuses 1221, . . . among the regions determined. Thereafter, the processing proceeds to step S603 illustrated in FIG. 6A.

—Step S603, Calculating Target Number for Management—

Figure 14:
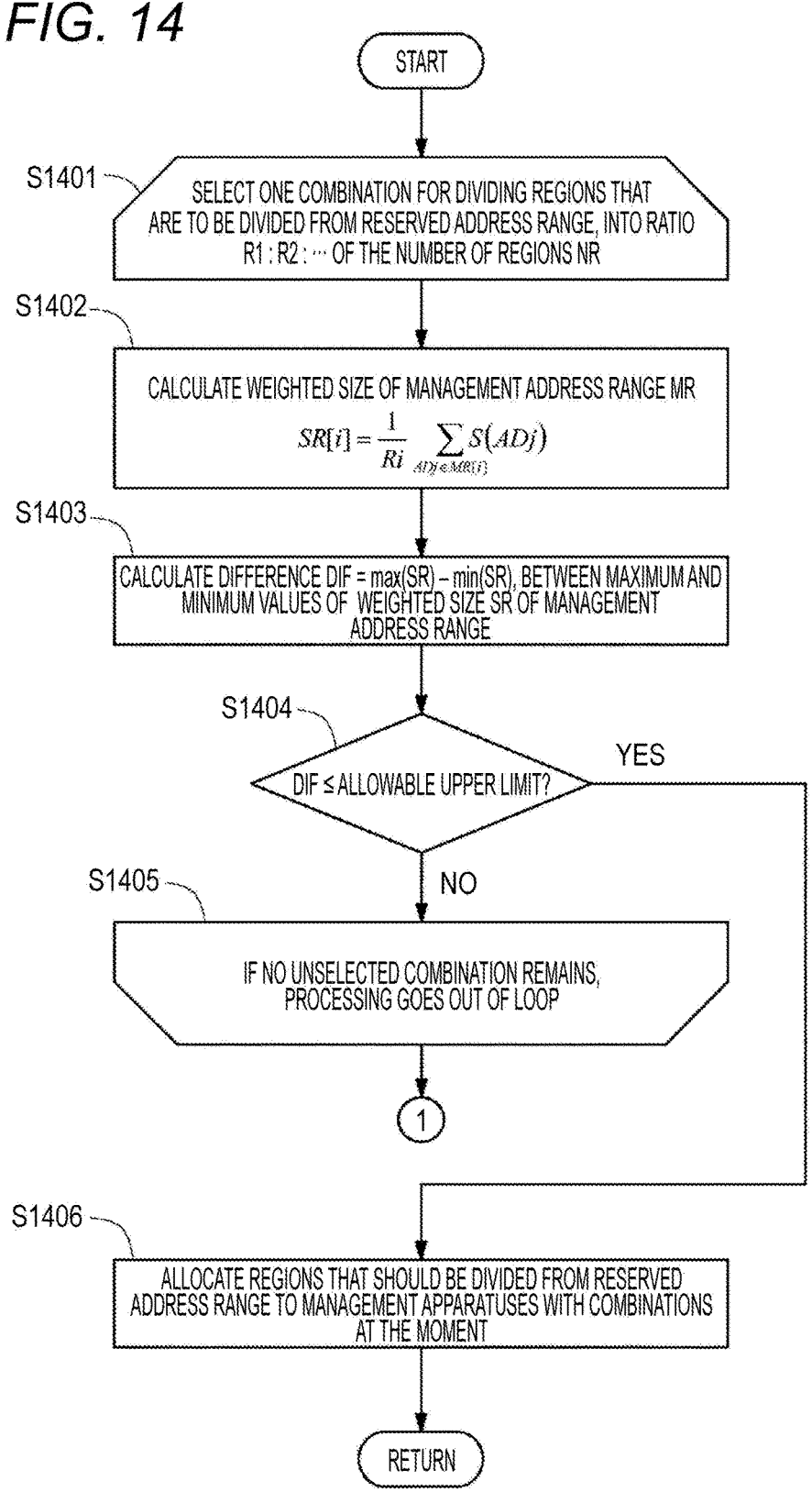
FIG. 14 is a flowchart illustrating steps of calculating a management address range to be allocated to each of the management apparatuses, the devices being included in the allocation processing in the reserved address range according to the third embodiment of the present invention.

FIG. 14 is a flowchart of step S603 that is the step of calculating the management address range, illustrated in FIG. 6A.

At step S1401, the allocation unit 411 selects one combination for dividing the regions AD1 and AD2 that should be divided from the reserved address range TRN, determined at step S1308, into the ratio R1:R2: . . . of the number of the regions NR [•] determined at the same step S1308. Thereafter, the processing proceeds to step S1402.

At step S1402, the allocation unit 411 calculates, by the following equation (2), the weighted size SR [i] of the management address range MR [i] that has been allocated to the i-th (i=1, 2, . . . ) management apparatus with the combination of the region ADj (j=1, 2, . . . ) selected at step S1401.

[Mathematic Expression 2]

$$SR[i] = \frac{1}{Ri} \sum_{ADj \in MR[i]} S(ADj). \qquad (2)$$

Herein the variable S (ADj) represents the size of the region ADj included in the management address range MR [i] of the i-th management apparatus. Among the weighted size SR [•], a difference attributed to the difference of the number of regions NR [•] has been canceled as a result of weighting by the inverse ratio (1/R1):(1/R2): . . . of the ratio R1:R2: . . . of the number of regions NR [•]. Thereafter, the processing proceeds to step S1403.

At step S1403, the allocation unit 411 obtains the maximum and minimum values among the weighted size SR [•] of the management address range, calculated at step S1402, and then, calculates the difference DIF between them: DIF=max(SR [•])−min(SR [•]). Thereafter, the processing proceeds to step S1404.

At step S1404, the allocation unit 411 determines the difference DIF calculated at step S1403 as the variation in the size of the management address range, and compares the difference DIF with the allowable upper limit of the variation. If the difference DIF exceeds the allowable upper limit, the processing proceeds to step S1405, if the difference does not exceed the limit, the processing proceeds to step S1406.

At step S1405, variation (difference) DIF of the size of the management address range exceeds the allowable upper limit. Therefore, the allocation unit 411 initially examines whether there remains any unselected combination among the combinations for dividing the regions AD1, AD2, . . . that should be divided from the reserved address range TRN, into the ratio R1:R2: . . . of the number of regions NR [•]. If any unselected combination remains, processing proceeds to step S1401, and the processing is repeated from step S1402 related to one of the combinations. On the other hand, if no unselected combination remains, the processing goes out of the loop from step S1401 to step S1405, and then, proceeds to step S1307 illustrated in FIG. 13. In this case, since the variation (difference) DIF in the size of the management address range in any combination of regions AD1, . . . exceeds the allowable upper limit, the allocation unit 411 reduces the division unit UDV to one-half of the existing unit (when not divisible, fraction is rounded off). Thereafter, the processing is repeated from step S1304, namely from the second stage, as illustrated in FIG. 13.

At step S1406, the variation (difference) DIF in the size of the management address range is the allowable upper limit or less, the allocation unit 411 allocates the regions AD1, . . . that should be divided from the reserved address range TRN, to the management apparatuses with the combinations being selected at the moment. Thereafter, the processing proceeds to step S604 illustrated in FIG. 6A.

[Advantages of Third Embodiment]

According to the third embodiment of the present invention, similarly as in the first embodiment, the allocation apparatus 125 allocates the reserved address range TRN to the management apparatuses 121 to 123. This allocation need not be changed as the connection state has been changed between the device 110 and the network NTW. Therefore, the allocation apparatus 125 need not monitor the connection state. As a result, it is possible to distribute detection processing for a new device to the management apparatuses 121 to 123, decreasing the burden on the allocation apparatus 125.

According to the third embodiment of the present invention, unlike the first embodiment, the target number for management is not set uniformly among the management apparatuses 121 to 123; the number is set to different values according to the ratio of the manageable upper limit. As such, the processing capacity of the management apparatuses are reflected to the evaluation of the burden on the management apparatuses, the burden on the apparatuses will be further precisely equal.

Furthermore, the IP addresses of the devices actually managed by the management apparatuses at the moment, are included evenly, quantity being the division unit UDV, in any of the regions AD1, AD2, . . . to be divided from the reserved address ranges TRN. Therefore, when a difference exists only in the combination of these regions AD1, . . . , as illustrated in FIGS. 11A and 11B, the number of devices to be managed MDV is maintained as a setting value for any of the management apparatuses, and does not exceed the target number for management NDV: MDV≤NDV, in particular. Therefore, the allocation unit 411, by repeating the second and third stages each time the division unit UDV is reduced, can suppress the variation (difference) DIF in the size of the management address range to the allowable upper limit or less, for any of the management apparatuses, while maintaining the number of devices to be managed MDV to the target number for management NDV or less. As such, the allocation apparatus 125 can change the management address ranges of the management apparatuses to substantially equalize the burden on each of the management apparatuses with substantially no change in the amount of resource for each of the management apparatuses.

[Modification of Third Embodiment]

(A) The allocation unit 411, as soon as it has detected, among the combination of the regions AD1, AD2 to be divided from the reserved address range TRN, the combination in which the variation in the size of the management address range is the allowable upper limit or less, allocates the regions AD1, . . . to the management apparatuses 121 to 123 with that combination. The allocation unit 411 may alternatively detect the combination in which the variation in the size of the management address range is the minimum among all combinations, and then, may allocate the regions to the management apparatuses with that combination, if the variation is the allowable upper limit or less.

(B) When the variation in the size of the management address range exceeds the allowable upper limit in any combination of the regions AD1 and AD2, . . . to be divided from the reserved address range TRN, the allocation unit 411 reduces the division unit UDV to one-half of the existing unit and repeats the processing. In this case, the reduction ratio of the division unit UDV may be other than one-half, provided the value is a positive value that is smaller than one. Furthermore, the fraction left indivisible after reduction of the division unit UDV may be rounded or rounded up, as well as rounded off.

(C) [Controlling Time Interval of Polling]

The allocation apparatus 125 according to the above-described first to third embodiments uses the management information MNG that has been obtained from the management apparatuses 121 to 123 by the acquisition unit 412, in dynamically allocating the reserved address range TRN to the management apparatuses 121 to 123. The allocation apparatus 125 may further use the management information MNG in instructing the time interval of polling for the devices to be managed, to the management apparatuses 121 to 123. For example, (I) Based on the management information MNG, the evaluation unit 413 may evaluate the importance level of the devices actually managed by the management apparatuses 121 to 123, and reduces the time interval of polling toward the management apparatus that manages the device having a higher importance level than the other devices. Separately from the above, (II) Based on the management information MNG, the evaluation unit 413 may detect, from among the management apparatuses 121 to 123, a management apparatus in which the number of devices actually managed exceeds the manageable upper limit, and then, cause the management apparatus to extend the time interval of polling.

—Control I—

Figure 15A:
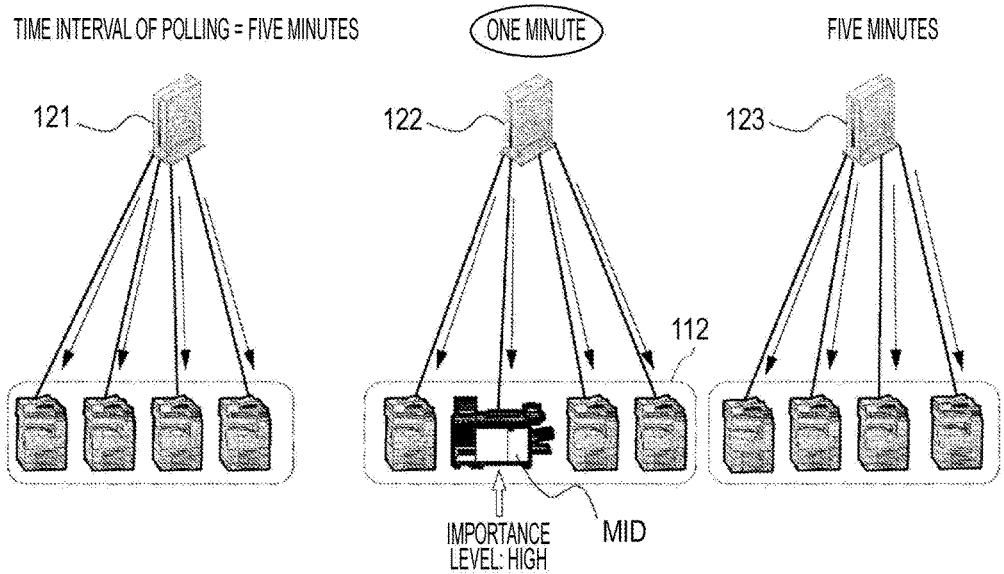
FIG. 15A is a schematic diagram illustrating the time interval of polling by control I corresponding to the importance level of the device.

FIG. 15A is a schematic diagram illustrating the time interval of polling by control I. Referring to FIG. 15A, the device group 112 managed by the second management apparatus 122 includes a device MID (hereinafter, referred to as a "high operation rate device") that has higher processing capacity or utilization frequency than any other device. Based on the management information MNG of the management apparatuses 121 to 123, the evaluation unit 413 reads or calculates parameter values for evaluating processing capacity or utilization frequency of the devices, including printing speed, the number of users, and the number of sheets printed, for the devices to be managed. Using the values obtained, the evaluation unit 413 evaluates the importance level of each of the devices. As illustrated in FIG. 8A, the larger the parameter values, the higher the importance level of the devices. Therefore, the evaluation unit 413 detects a high operation rate device MID based on the difference of the importance level among the devices. At this time, the evaluation unit 413 causes the second management apparatus 122 that manages the high operation rate device MID to reduce the time interval of polling for the device group 112 to be managed. Specifically, the evaluation unit 413 initially sets the time interval of polling, which should be performed by the second management apparatus 122, to a shorter value than the original time interval indicated by the setting information SET that has been obtained by the second management apparatus 122. For example, when the time interval of polling indicated by the setting information SET is five minutes, the evaluation unit 413 reduces the time interval of polling, which should be performed by the second management apparatus 122, to a value significantly shorter than five minutes, for example, up to one minute. The evaluation unit 413 then incorporates the information that defines reduced time interval of polling=one minute, into the new setting information NSE that is to be transmitted to the second management apparatus 122. The instruction unit 414 transmits the new setting information NSE to the second management apparatus 122 via the network interface 470. According to the new setting information NSE, the second management apparatus 122 reduces the time interval of polling toward the device group 112 to be managed, from five minutes to one minute.

The high operation rate device MID typically causes a malfunction more frequently than other devices. As such, the frequency of transmitting the information ERR related to the malfunction to the management apparatus is higher in the high operation rate device MID than the other devices. As described above, however, since the time interval of polling by the second management apparatus 122 is reduced, the second management apparatus 122 has lower risk of failure in detecting malfunctions in the device group 112 to be managed.

In this way, the allocation apparatus 125 has the management apparatuses 121 to 123 to extend or reduce the time interval of polling, according to the importance level of device that has been evaluated based on the management information MNG. As a result, it is possible for each of the management apparatuses to maintain high reliability in management operations, regardless of the operation rate of the device to be managed.

—Control II—

Figure 15B:
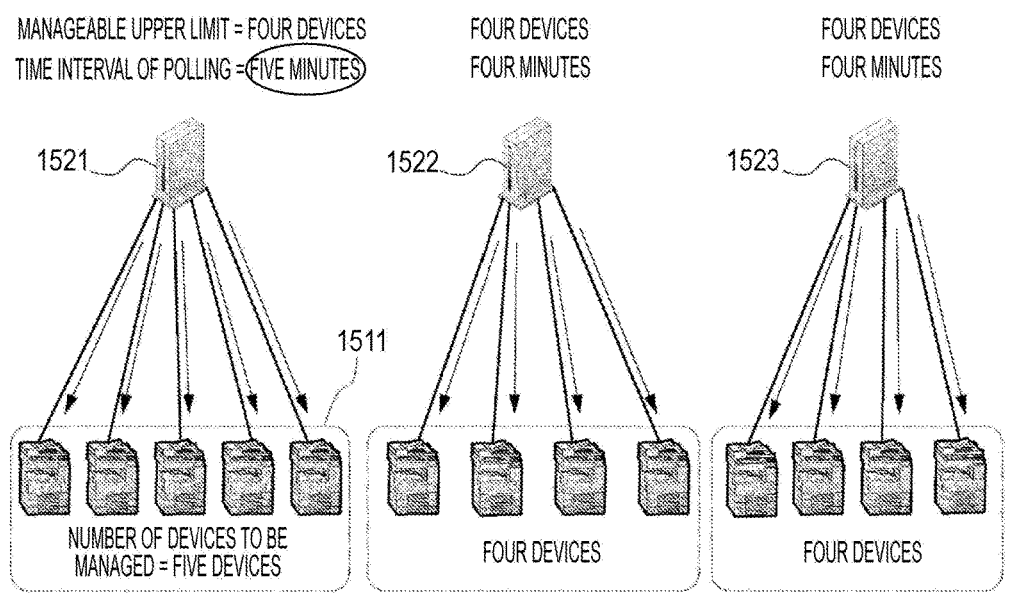
FIG. 15B is a schematic diagram illustrating the time interval of polling by control II, when the number of devices to be managed exceeds the manageable upper limit by the management apparatus.

FIG. 15B is a schematic diagram illustrating polling time interval by control II. Referring to FIG. 15B, the manageable upper limit for each of the management apparatuses 1521, 1522, and 1523 is four. On the other hand, the number of devices managed by the first management apparatus 1521 is five; the number of devices managed by each of the management apparatuses 1522 and 1523 is four. The evaluation unit 413 initially reads the manageable upper limit=4, from the setting information SET of the management apparatuses 1521 to 1523. The evaluation unit 413 subsequently obtains the number of devices to be managed=5, 4, and 4, based on the management information MNG of the management apparatuses 1521 to 1523. Furthermore, by comparing the manageable upper limit and the number of devices to be managed, the evaluation unit 413 detects that the number of devices managed by the first management apparatus 1521, namely, "5", exceeds the manageable upper limit "4". At this time, the evaluation unit 413 causes the first management apparatus 1521 to extend the time interval of polling toward the device group 1511 to be managed. Specifically, the evaluation unit 413 initially sets the time interval of polling, which should be performed by the first management apparatus 1521, to a longer value than the original time interval indicated by the setting information SET that has been obtained by the first management apparatus 1521. For example, when the time interval of polling indicated by the setting information SET is four minutes, the evaluation unit 413 extends the time interval of polling the first management apparatus 1521 should perform, to a value significantly longer than four minutes, up to five minutes, for example. The evaluation unit 413, then, incorporates the information that defines the extended time interval of polling=five minutes, into the new setting information NSE that is to be transmitted to the first management apparatus 1521. The new setting information NSE is transmitted to the first management apparatus 1521 from the instruction unit 414, via the network interface 470. According to the new setting information NSE, the first management apparatus 1521 extends the time interval of polling toward the device group 1511 to be managed, from four minutes to five minutes.

Allocation of the reserved address range, performed by the allocation apparatus 125 according to the first and second embodiments, does not depend on the manageable upper limit of the management apparatus. Therefore, even if the number of devices to be managed or the importance level becomes equal among the management apparatuses, the number of devices managed by any of the management apparatuses may, in some cases, exceed the manageable upper limit. Furthermore, in the third embodiment, when the total number of devices to be managed is excessive, the target number for management of any of the management apparatuses may, in some cases, exceed the manageable upper limit. In any case, however, the allocation apparatus 125 as described above, causes the management apparatus in which the number of actually managed devices exceeds the manageable upper limit, to extend the time interval of polling for the devices to be managed. This decreases the burden on the management apparatus, making it possible to maintain sufficiently high processing capacity in the management apparatus.

Note that each of the first to third embodiments and their modifications may be combined with the other embodiments or their modifications, if possible.

The present invention relates to a management system for an information processing device, as described above, and dynamically allocates an address range, on a network, that are allocatable to a plurality of information processing devices, to a plurality of management apparatuses. In this way, the embodiments of the present invention obviously have industrial applicability.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An allocation apparatus configured to allocate a plurality of information processing devices to two or more management apparatuses that perform distributed management of the plurality of information processing devices, the allocation apparatus comprising:
an allocation unit configured to allocate an address range on a network, allocatable to a plurality of information processing devices, among the two or more management apparatuses;
an acquisition unit configured to obtain, from each of the two or more management apparatuses, management information indicating a state of at least one of the plurality of information processing devices whose address belongs to a respective range allocated to the each of the two or more management apparatuses; and
an evaluation unit configured to evaluate variation in an importance level among the two or more management apparatuses, based on the management information obtained by the acquisition unit,
wherein the allocation unit dynamically performs allocation of the address range on the network based on the management information that has been obtained by the acquisition unit from the each of the two or more management apparatuses,
wherein the allocation unit, by dynamically allocating the address range, decreases the variation in the importance level,
wherein the management information that has been obtained by the acquisition unit includes an item for estimating an operation rate of the information processing device managed by each of the two or more management apparatuses,
and wherein the evaluation unit estimates, based on the item, the operation rate of the information processing device managed by the management apparatus, and uses an estimated value for evaluating the importance level of the management apparatus.

2. The allocation apparatus according to claim 1, wherein the evaluation unit is configured to evaluate variation in the number of information processing devices to be managed among the two or more management apparatuses, based on the management information obtained by the acquisition unit,
wherein the allocation unit, by dynamically allocating the address range, decreases the variation in the number of the information processing devices to be managed.

3. The allocation apparatus according to claim 1,
wherein the item for estimating the operation rate of the information processing device managed by each of the two or more management apparatuses includes the number of users or utilization frequency of the information processing device for a predetermined period of time.

4. The allocation apparatus according to claim 1,
wherein the evaluation unit detects a management apparatus in which the number of information processing devices actually managed by the management apparatus exceeds a manageable upper limit, from among the two or more management apparatuses, based on the management information that has been obtained by the acquisition unit, and
the evaluation unit causes the management apparatus to extend a time interval of polling for the information processing device to be managed.

5. The allocation apparatus according to claim 1, configured to have an additional function as one of the two or more management apparatuses.

6. The allocation apparatus according to claim 1, wherein the address on the network is an IP address.

7. A management system comprising:
the allocation apparatus according to claim 1;
the plurality of information processing devices; and
the two or more management apparatuses configured to perform the distributed management of the plurality of information processing devices.

8. The management system according to claim 7, further comprising a host computer configured to obtain, from the two or more management apparatuses, information required for maintaining the plurality of information processing devices.

9. The management system according to claim 7, wherein the plurality of information processing devices are image forming devices.

10. An allocation apparatus configured to allocate a plurality of information processing devices to two or more management apparatuses that perform distributed management of the plurality of information processing devices, the allocation apparatus comprising:
an allocation unit configured to allocate an address range on a network, allocatable to a plurality of information processing devices, among the two or more management apparatuses;
an acquisition unit configured to obtain, from each of the two or more management apparatuses, management information indicating a state of at least one of the plurality of information processing devices whose address belongs to a respective range allocated to the each of the two or more management apparatuses; and
an evaluation unit configured to evaluate variation in an importance level among the two or more management apparatuses, based on the management information obtained by the acquisition unit,
wherein the allocation unit dynamically performs allocation of the address range on the network based on the management information that has been obtained by the acquisition unit from the each of the two or more management apparatuses,
wherein the allocation unit, by dynamically allocating the address range, decreases the variation in the importance level,
wherein the management information that has been obtained by the acquisition unit includes an item for evaluating processing capacity of the information processing device managed by each of the two or more management apparatuses,
and wherein the evaluation unit evaluates the processing capacity of the information processing device managed by the management apparatus, and uses an evaluated value for evaluating the importance level of the management apparatus.

11. The allocation apparatus according to claim 10,
wherein the item for evaluating the processing capacity of the information processing device managed by each of the two or more management apparatuses includes processing speed of the information processing device.

12. An allocation apparatus configured to allocate a plurality of information processing devices to two or more management apparatuses that perform distributed management of the plurality of information processing devices, the allocation apparatus comprising:

an allocation unit configured to allocate an address range on a network, allocatable to a plurality of information processing devices, among the two or more management apparatuses;

an acquisition unit configured to obtain, from each of the two or more management apparatuses, management information indicating a state of at least one of the plurality of information processing devices whose address belongs to a respective range allocated to the each of the two or more management apparatuses; and an evaluation unit configured to evaluate variation in the number of information processing devices to be managed among the two or more management apparatuses, based on the management information obtained by the acquisition unit, wherein the allocation unit dynamically performs allocation of the address range on the network based on the management information that has been obtained by the acquisition unit from the each of the two or more management apparatuses, wherein the allocation unit, by dynamically allocating the address range, decreases the variation in the number of the information processing devices to be managed, and wherein the evaluation unit evaluates the importance level of each of the plurality of information processing devices, based on the management information that has been obtained by the acquisition unit, and causes the management apparatus that manages the information processing device that has a higher importance level than any other information processing device among the plurality of information processing devices, to reduce a time interval of polling for the information processing device to be managed.

13. A method for allocating a plurality of information processing devices to two or more management apparatuses that perform distributed management of the plurality of information processing devices, the method comprising:

allocating an address range on a network, allocatable to a plurality of information processing devices, among the two or more management apparatuses;

obtaining, from each of the two or more management apparatuses, management information indicating a state of at least one of the plurality of information processing devices whose address belongs to a respective range allocated to the each of the two or more management apparatuses; and evaluating variation in an importance level among the two or more management apparatuses, based on the obtained management information, wherein the method is implemented so as to dynamically allocate the address range on the network based on the management information obtained from the each of the two or more management apparatuses, wherein, by dynamically allocating the address range, the variation in the importance level is decreased, wherein the management information that has been obtained includes an item for estimating an operation rate of the information processing device managed by each of the two or more management apparatuses, and wherein the method further includes estimating, based on the item, the operation rate of the information processing device managed by the management apparatus, and using an estimated value for evaluating the importance level of the management apparatus.

14. A non-transitory recording medium storing a computer readable program for causing a computer to execute the method according to claim 13.

* * * * *